(12) United States Patent
Wahl et al.

(10) Patent No.: US 8,657,692 B2
(45) Date of Patent: Feb. 25, 2014

(54) TORSION VIBRATION DAMPER AND DAMPING DEVICE AND TORQUE TRANSMISSION DEVICE

(75) Inventors: Peter Wahl, Karlsruhe (DE); Kai Sebastian Schenck, Offenburg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/354,075

(22) Filed: Jan. 19, 2012

(65) Prior Publication Data

US 2012/0190462 A1 Jul. 26, 2012

(30) Foreign Application Priority Data

Jan. 24, 2011 (DE) .......................... 10 2011 009 254

(51) Int. Cl.
*F16F 15/121* (2006.01)
(52) U.S. Cl.
USPC ....................................................... 464/68.92

(58) Field of Classification Search
USPC .................. 464/62.1, 64.1, 68.1, 68.9, 68.92; 192/203, 205
See application file for complete search history.

(56) References Cited

U.S. PATENT DOCUMENTS

| 4,932,921 | A  * | 6/1990  | Kobayashi et al. ........ 464/68.92 |
| 7,207,888 | B2 * | 4/2007  | Verhoog et al. ............ 192/203 X |
| 7,267,212 | B2 * | 9/2007  | Wack et al. |
| 8,287,391 | B2 * | 10/2012 | Jung ............................ 464/68.9 |

* cited by examiner

*Primary Examiner* — Gregory Binda
(74) *Attorney, Agent, or Firm* — Simpson & Simpson, PLLC

(57) ABSTRACT

A torsion vibration damper for a drive train of a motor vehicle, in particular a drive train of a hybrid vehicle, comprising: a spring support and a force transmission flange configured rotatable relative to the spring support, wherein at least one compression spring is provided between the spring support and the force transmission flange for transferring a mechanical torque, wherein a housing of the spring support is configured so that in a radial direction of the torsion vibration damper, at least one longitudinal end of the compression spring is supported at/in the spring support housing and/or a clearance remains between windings of a center section of the compression spring and a wall of the spring support.

9 Claims, 19 Drawing Sheets

(State of the Art)

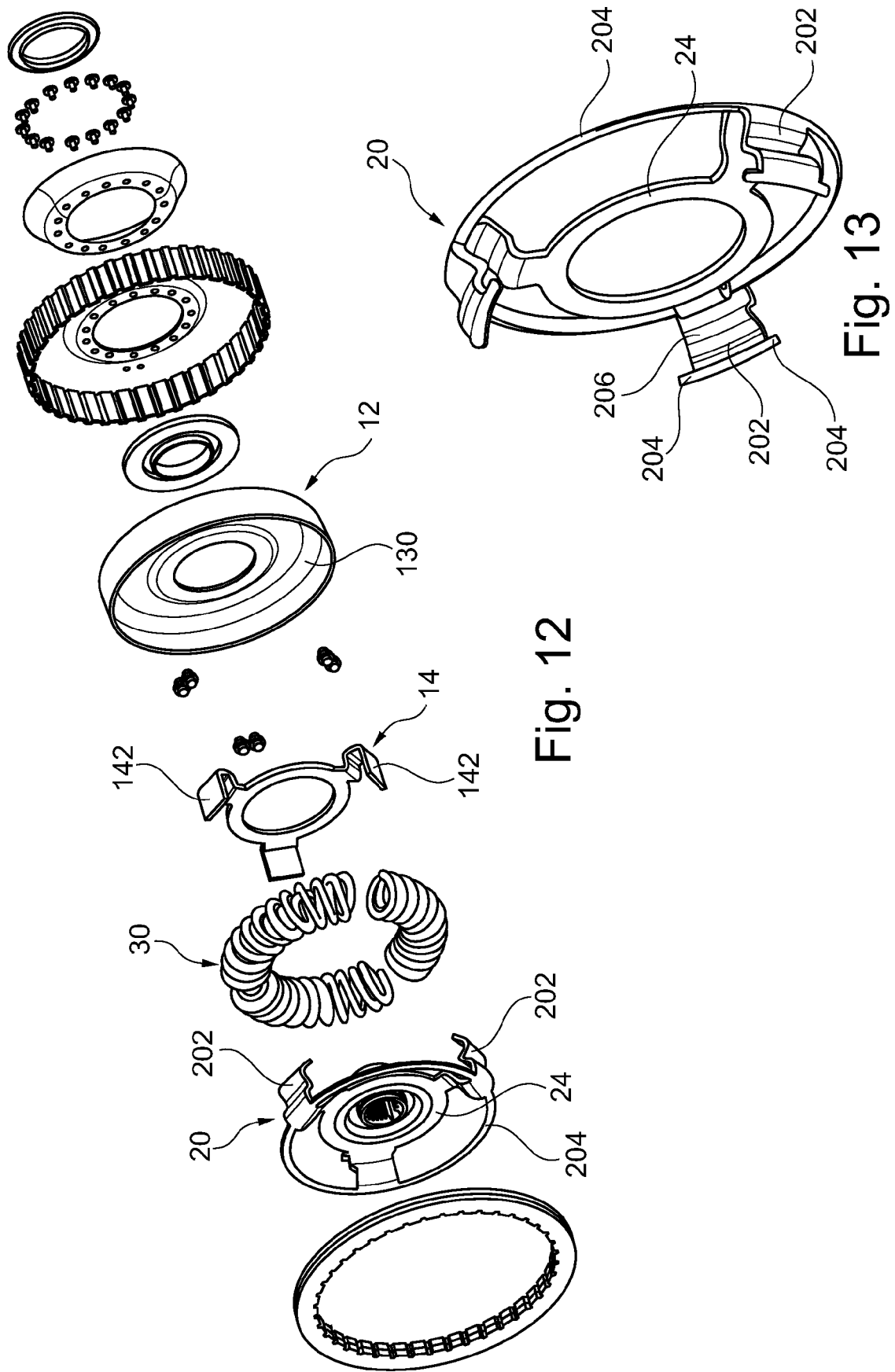

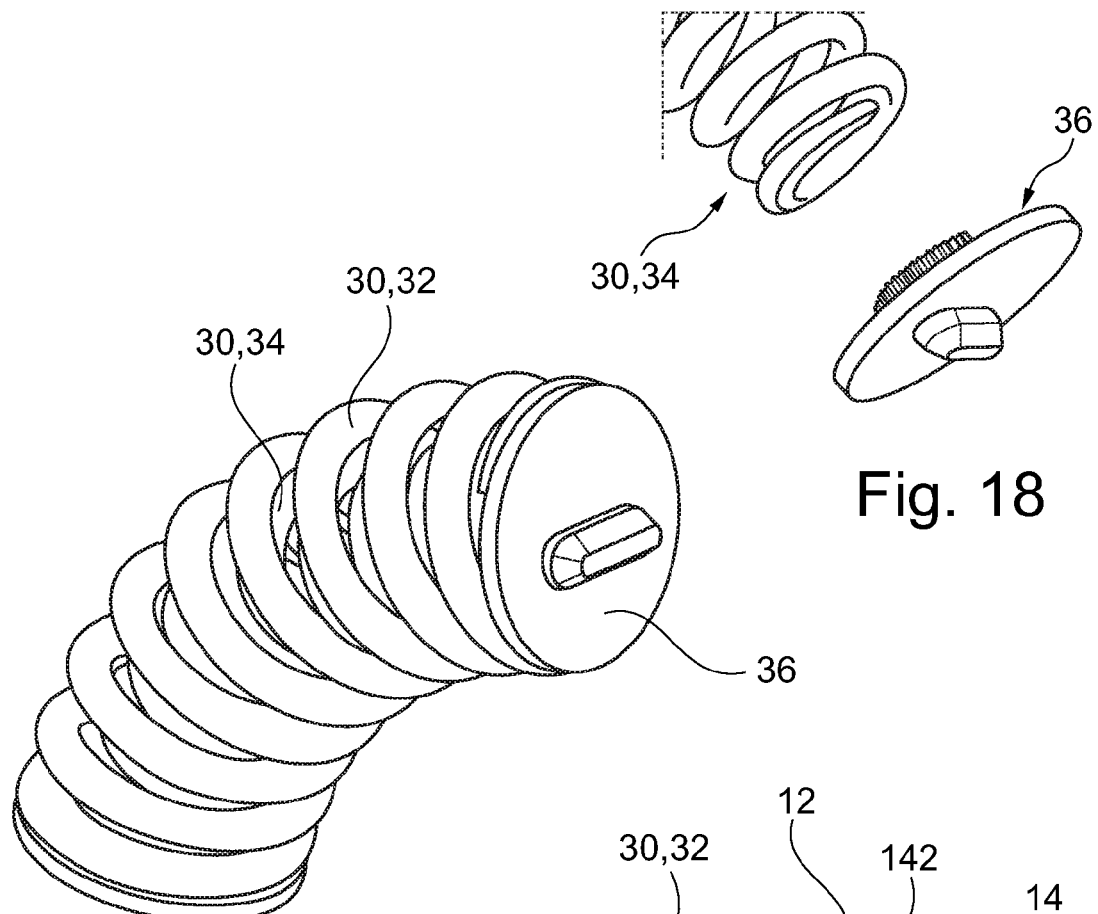
Fig. 18
Fig. 19
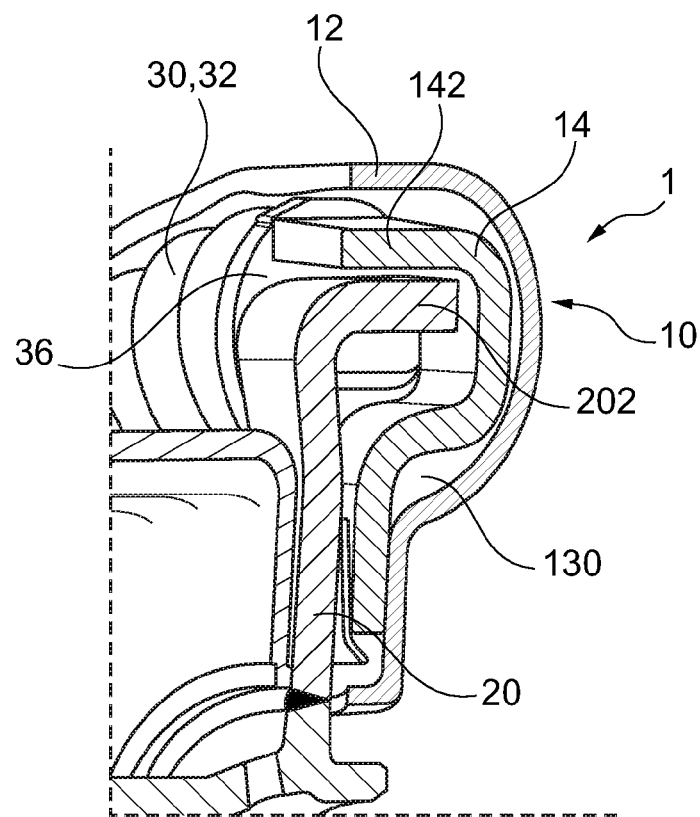
Fig. 20

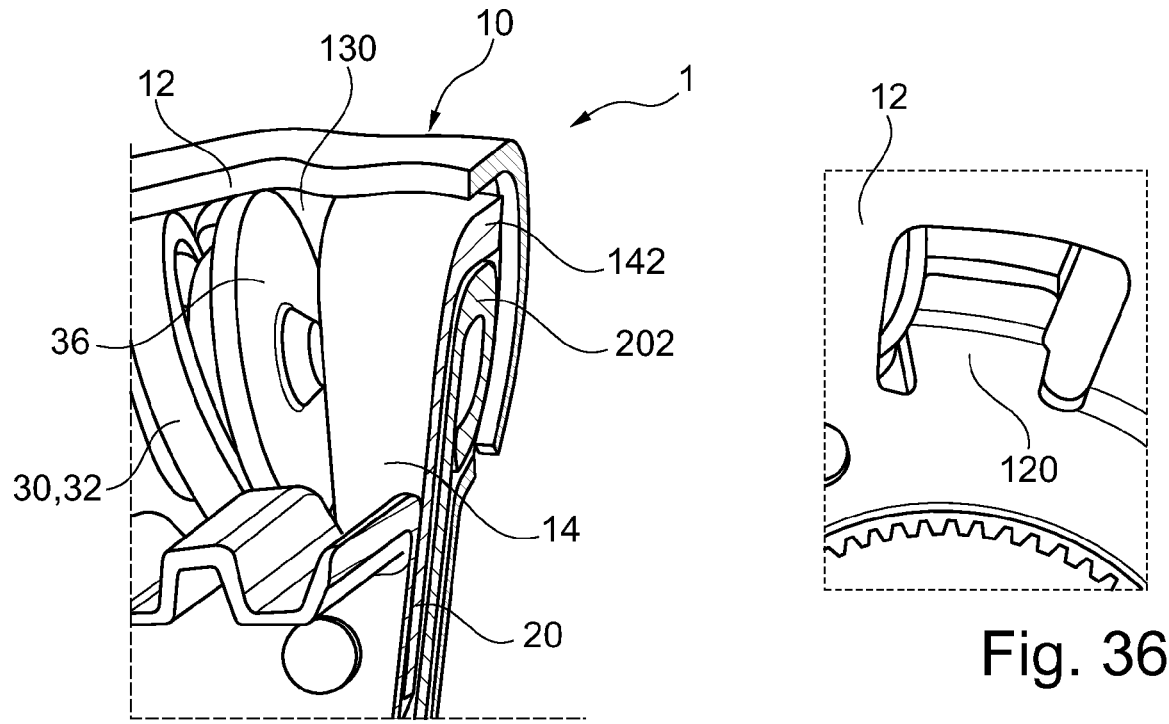
Fig. 34
Fig. 36
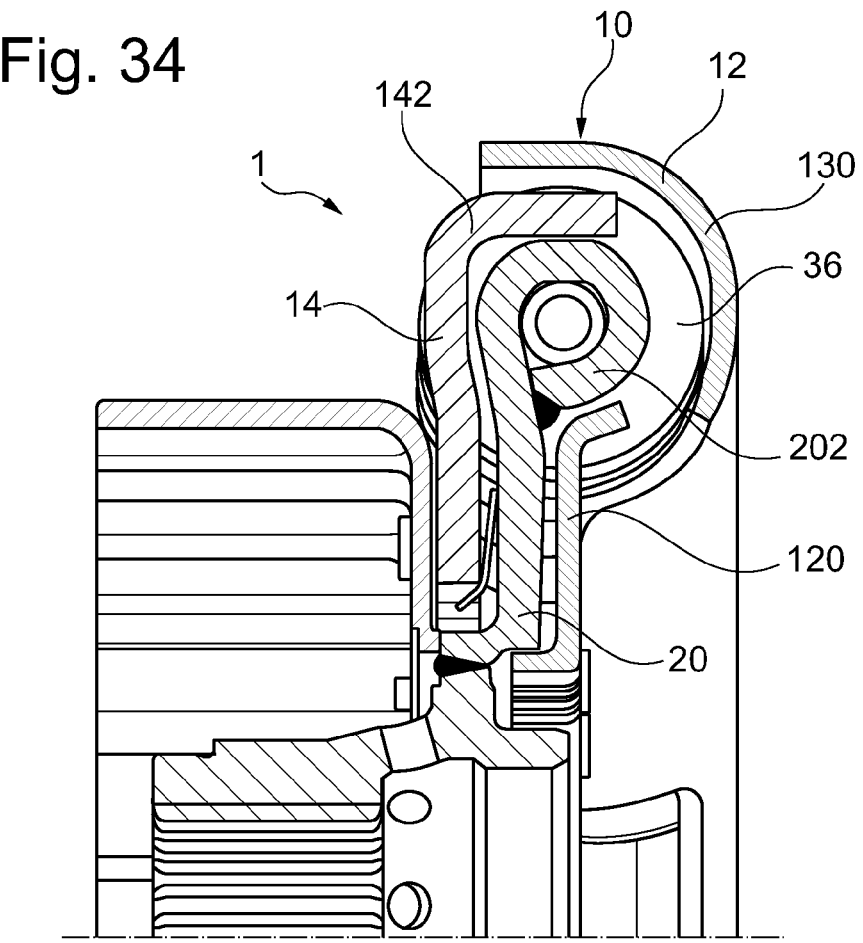
Fig. 35

TORSION VIBRATION DAMPER AND DAMPING DEVICE AND TORQUE TRANSMISSION DEVICE

CROSS-REFERENCE TO RELATED APPLICATIONS

This patent claims priority from German Patent Application No. 10 2011 009 254.4, filed Jan. 24, 2011, which application is incorporated herein by reference in its entirety.

FIELD OF THE INVENTION

The present invention relates to a torsion vibration damper for a drive train of a motor vehicle, in particular a drive train of a hybrid vehicle. Furthermore the invention relates to a damping device or a torque transmission device, e.g., a torque converter, a clutch, a clutch assembly, a damper, a torsion vibration damper, a turbine damper, a pump damper, a dual mass converter or a dual mass fly wheel or combinations thereof, optionally with a centrifugal force pendulum, wherein the damping device or the torque transmission device includes a torsion vibration damper.

BACKGROUND OF THE INVENTION

In torsion vibration dampers with straight compression springs the compression springs are radially and axially supported by two side discs configured with lugs (cf. also FIG 1). For supporting centrifugal forces and for transmitting a mechanical torque the side discs have to be axially connected with one another through fasteners, e.g., rivets. In the prior art the connection is radially applied outside the straight compression springs in order to implement a good mechanical connection of the components and sufficient durability. A torsion vibration damper of this type requires large radial space, wherein a damping capacity is reduced due to comparatively small straight compression springs. On the one side the axial connection itself on the other side the necessary edge distances (fabrication, stamping) and clearances require additional radial installation space which either has a disadvantageous effect upon the diameter of the straight compression spring and/or their effective radius which causes a reduced damping rate and thus reduced mechanical vibration insulation.

In torsion vibration dampers with arcuate compression springs, so called bow springs, the bow springs are radially and also axially supported by a sheet metal component configured as a spring channel, also designated as a spring retainer. In this spring channel spring stops for introducing mechanical torques are applied or integrally formed. A reaction of the torques to a transmission is performed through a flange component which receives the mechanical torque from the bow springs typically through externally arranged lugs, wherein the bow springs can move relative to the respective lugs in a radial and also in an axial direction. When a configuration of a torsion vibration damper of this type configured as a bow spring damper shall be friction optimized it is necessary to relieve the bow springs between the respective longitudinal ends in the radial and also in the axial direction in order to provide windings without friction. This is achieved through an externally closed flange, wherein at least a double sheet metal thickness (flange) is required for additional radial installation space. When engaging the bow spring with a so-called nose flange end caps are required for correctly supporting the bow springs and for a low wear transfer of the bow springs.

BRIEF SUMMARY OF THE INVENTION

The invention relates to a torsion vibration damper for a drive train of a motor vehicle, in particular a drive train of a hybrid vehicle, comprising: a spring support and a force transmission flange configured rotatable relative to the spring support, wherein at least one compression spring is provided between the spring support and the force transmission flange for transferring a mechanical torque, wherein a housing of the spring support is configured so that in a radial direction of the torsion vibration damper at least one longitudinal end of the compression spring is supported at/in the spring support housing and/or a clearance remains between windings of a center section of the compression spring and a wall of the spring support. The invention also relates to a torsion vibration damper for a drive train of a motor vehicle, in particular a drive train of a hybrid vehicle, comprising: a spring support and a force transmission flange configured rotatable relative to the spring support, wherein at least one compression spring preferably configured as a bow spring is provided between the spring support and the force transmission flange for transferring a mechanical torque, wherein through a flange hook of the force transmission flange at least one longitudinal end of the compression spring is supported and/or supportable in the spring support housing, so that at least the respective longitudinal end of the compression spring is offset in a radial direction of the torsion vibration damper from the wall of the spring support.

Thus, it is an object of the invention to provide an improved torsion vibration damper for a drive train of a motor vehicle, in particular a drive train of a hybrid vehicle. Furthermore, it is an object of the invention to provide an improved damper device and/or an improved torque transmission device with an improved torsion vibration damper, in particular for a drive train of a motor vehicle. Thus, in torsion vibration dampers with straight or arcuate compression springs a radial installation space shall be used in a better manner. Furthermore spring properties of a straight or arcuate compression spring shall be improved over the prior art, in particular mechanical friction between the straight or arcuate compression spring and a spring support shall be improved. Furthermore the torsion vibration damper according to the invention shall have little radial and axial installation space and good mechanical durability. Furthermore it shall be provided for embodiments of the invention to be able to omit end caps at the arcuate compression springs.

The object of the invention is achieved through a torsion vibration damper for a drive train of a motor vehicle, in particular a drive train of a hybrid vehicle and through a damping device or torque transmission device like, e.g., a torque converter, a clutch, a clutch assembly, a damper, a torsion vibration damper, a turbine damper, a pump damper, a dual mass converter or a dual mass fly wheel or combinations thereof, optionally with a centrifugal force pendulum.

The torsion vibration damper includes a spring support, also designated a retainer, and a force transmission flange rotatably provided relative to the spring support, wherein at least one straight or arcuate compression spring is provided between the spring support and the force transmission flange for transmitting a mechanical torque. A housing of the spring support according to the invention is configured so that at least one longitudinal end of the compression spring is supported in the radial direction of the torsion vibration damper at/in the spring support housing and/or a free space is provided between windings of a center section of the compression spring and a wall of the spring support. Furthermore, a force transmission flange according to the invention includes a flange hook, wherein a longitudinal end of the compression spring is supported or supportable in the spring support housing through the flange hook so that at least the respective longitudinal end of the compression spring is offset from the wall of the spring support in a radial direction of the torsion vibration damper.

In embodiments of the invention the respective longitudinal end of the compression spring is partially enveloped by the spring support housing in a circumferential direction, wherein the spring support housing for enveloping the compression spring includes an inward oriented protrusion, in particular an embossing at which the respective longitudinal end of the compression spring contacts or is contactable. The protrusion or the embossing is provided in a radial outer portion of the spring support housing so that it extends inwardly in the spring support housing for which preferably a respective section of the wall of the spring support housing is bent inwardly into the spring support housing. The spring support housing or the compression spring is preferably configured so that the clearance between the windings of the center section of the compression spring and the respective wall of the spring support remote from the protrusion or the embossing is maintained at least for slow speeds of the torsion vibration damper. The spring support or the retainer thus includes a section with increased height in the respective portions of the center sections of the compression springs which leads to a reduction of the friction between the compression spring and the spring support. Furthermore the force transmission flange or its flange hook includes devices which support the respective longitudinal ends of the bow springs in axial and radial directions up to a certain extent.

In a first embodiment of the invention the compression spring is a straight compression spring. Thus, the spring support housing includes a u-shaped ring channel in which the straight compression spring is partially received in the radial direction and in the axial direction of the torsion vibration damper. For a support and an actuation of the respective straight compression spring that is caused by the spring support housing an actuation hook is provided in the u-shaped ring channel, wherein a respective longitudinal end of the straight compression spring contacts the actuation hook or is contactable through the actuation hook. The actuation hook is preferably provided at a support device that is configured as a support ring, in particular wherein the support device is fixated in the spring support housing. Thus, the actuation hook of the support device extends into the u-shaped ring channel. Through using a spring channel or the u-shaped ring channel in a spring support or a retainer of a spring damper with straight compression springs it is possible to implement a good spring rate for a small radial and axial installation space. Thus, cost effective straight compression springs can be used which have low friction with the support and furthermore have a stable support in the spring support. Furthermore, the number of components is reduced over the prior art which generates additional cost savings.

In embodiments of the invention the actuation hook preferably includes actuation edges or surfaces that are substantially offset parallel from one another, through which the respective longitudinal end of the straight compression spring is supportable and/or actuatable in a radially outer and a radially inner portion in the circumferential direction of the torsion vibration damper. The actuation edges or surfaces of the actuation hook that are offset from one another are preferably arranged relative to one another so that they define a plane which is parallel to a plane which is defined by two actuation edges or surfaces which are directly adjacent to one another and which are associated with a second actuation hook of the spring support housing. Preferably a flange hook of the force transmission flange is actuatable by the straight compression spring, wherein the flange hook is preferably arranged substantially centrally relative to the face of the straight compression spring, wherein for a torsion vibration damper that is not operational the respective flange hook is preferably arranged substantially parallel to an actuation hook. An actuation edge or surface of the respective flange hook that is engageable by the straight compression spring it thus preferably arranged in an identical plane with the engagement edges or surfaces of the engagement hook offset from one another. Furthermore the compression spring can be hooked up through a lug at the flange or at the engagement hook and can thus be radially fixated.

Preferably the flange hook of the force transmission flange and a longitudinal end or a longitudinal end section of the compression spring are configured corresponding to one another, so that the flange hook supports the longitudinal end of the compression spring in one radial outward direction. Thus, the longitudinal end of the compression spring that moves away from the respective actuation hook in the circumferential direction is at least prevented from a radial movement in an outward direction so that the longitudinal end does not come in contact with an inner wall of the spring housing and does not create any undesirable mechanical friction. In preferred embodiments of the invention the flange hook engages the compression spring or an end cap of the compression spring through an engagement pinion. Furthermore the engagement hook can radially reach over a protrusion at the compression spring or the end cap of the compression spring at least on the radial outside. This can certainly be also kinematically inverted.

In a second embodiment of the invention the torsion vibration damper is configured so that the respective flange hook of the force transmission flange has a configuration in the portion where it is actuated by the compression spring, so that the respective longitudinal end of the compression spring is supported in the radial direction and possibly also in the axial direction towards the outside. For this purpose the flange hook is preferably provided at a support device which is in particular provided as a support ring. The respective flange hook can at least include a catch lug extending there from essentially in circumferential or tangential directions of the force transmission flange, wherein the catch lug reaches over the respective compression spring at least at its longitudinal end. An over reaching of the compression spring through the catch lug is preferably provided axially offset with respect to the center of the cross section of the compression spring. Furthermore, preferably two catch lugs are provided which are arranged offset with respect to the center of the cross section of the compression spring. Thus, two catch lugs that are oriented towards each other of two directly adjacent flange hooks can be connected with one another, e.g., in an integral manner, wherein a connection portion of the two flange lugs is preferably configured so that it is lifted off from the compression spring.

The radial and possibly also axial catching or securing of the arcuate compression spring according to the invention is facilitated without or with only very small additional installation space requirement.

The raised arcuate compression spring provides a reduction of the mechanical friction in the entire system. According to the invention end caps at the arcuate compression springs can be omitted in this embodiment since the arcuate compression springs are supported or retained at their longitudinal ends at their outer diameter. Through the radial and possibly also axial support of the arcuate springs through catch lugs integrally formed at the force transmission flange according to the invention it is possible to substantially reduce mechanical friction in a spring support or a retainer damper without requiring additional radial installation space or only requiring very little radial installation space.

In embodiments of the invention the respective flange hook includes an indentation or a protrusion at a radially outer portion of the flange hook so that an actuation edge or surface of the flange hook is oriented towards a center of a compression spring. The actuation edge or surface of the flange hook for engaging the compression spring is configured so that the actuation edge or the actuation surface preferably partially approximately follows a contour of the compression spring, wherein the actuation edge or surface is substantially u-shaped with a short arm. For a support and/or an actuation of the compression spring that is provided by the spring support housing preferably an actuation hook is provided at which a respective longitudinal edge of the compression spring contacts or is contactable. The actuation hook is preferably provided at a support device in particular configured as a support ring, wherein the support device is fixated in the spring support housing, wherein the actuation hook is provided radially offset relative to the flange hook and preferably engages the flange hook. The respective actuation hook of the spring support housing can be arranged so that it actuates or supports the compression axially on both sides symmetrically and radially outside of a center of the compression spring, wherein the compression spring can include an outer spring and an inner spring thus forms a compression spring assembly.

BRIEF DESCRIPTION OF THE DRAWINGS

The invention is subsequently described in more detail based on embodiments with reference to the appended drawing figures, wherein:

FIG. 12 is an exploded view of the second variant of the torsion vibration damper according to the invention with arcuate compression springs;

FIG. 13 is a detail of the hub flange;

FIG. 18 is a detail of the end cap of FIG. 11;

FIG. 19 is a detail of the coil spring and end cap of FIG. 11;

FIG. 20 is a detail of the hub flange, lug, flange hook, and coil spring of FIG. 11;

FIG. 34 is a detail of a second variant of the torsion vibration damper according to the invention with arcuate compression springs;

FIG. 35 is a partial cross-sectional view of a second variant of the torsion vibration damper according to the invention with arcuate compression springs;

FIG. 36 is a detail of an additional hook;

DETAILED DESCRIPTION OF THE INVENTION

Figure 1:
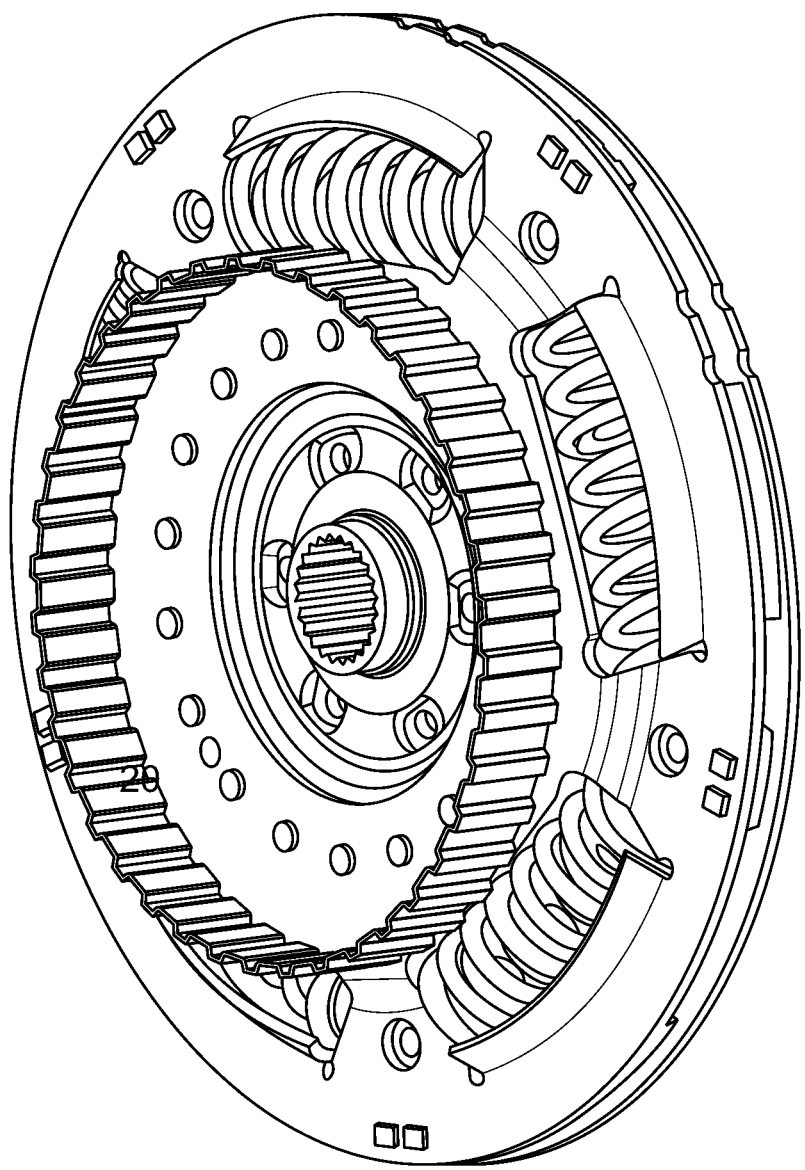
FIG. 1 illustrates a radially tall prior art torsion vibration damper with five straight compression springs or compression spring assemblies.

FIGS. 2 through 7 illustrate the first variant of the invention, wherein the torsion vibration damper 1 according to the invention includes five straight compression spring arrangements 30 which respectively include an outer spring 32 and an inner spring 34. Certainly also individual springs or parallel springs with a single stage or multiple stages can be used also in other quantities. The compression springs 30 are received in a spring support housing 12 of a spring support 10 or a spring receiver 10 which can also be designated as spring support ring 10 or a spring retainer 10, wherein the spring support housing 12 includes a ring channel 130 which is approximately u-shaped in sections (see FIGS. 2 and 3). Thus the longitudinal extensions of the compression springs 30 are arranged like in an even polygon and enveloped by the circular ring channel 130 (see in particular FIG. 4) wherein the compression springs 30 are at least partially supported in radial and axial directions. Together with the spring support housing 12 a support device 14 is provided which is, in particular, configured as a support ring 14, wherein the support device offsets the compression springs 30 from one another through actuation hooks 142. For this purpose the approximately plate shaped spring support housing 12 (see FIG. 4) is fixated in an inner portion with the approximately star or disc shaped support device 14, in particular riveted together, wherein the actuation hooks 142 radially extends into the u-shaped ring channel 130 (see FIG. 2). The spring support 10 is mechanically connectable, e.g., with a shaft of clutch (left side in FIG. 2) and a shaft of an electric motor (right side of FIG. 2). Using only one shaft, thus of the clutch or the electric motor or also another configuration is certainly possible.

One respective actuation hook 142 of the support device 14 at both its ends respectively supports a longitudinal compression spring 30 in the circumferential direction. For supporting and/or actuating the respective compression spring 30 a respective actuation hook 142 includes a substantially axially extending actuation edge or an actuation surface (see FIG. 5), wherein preferably an individual actuation hook 142 includes two arms per longitudinal end of a compression spring 30, wherein the arms are preferably integrally connected through a bar which extends essentially in the radial direction. The two arms and the bar are essentially u-shaped in a center cross section, wherein the bar can be arranged in windows of the windows support housing 12 (see FIG. 2) thus the actuation edges or actuation surfaces respectively oriented towards one another of two actuation hooks 142 directly adjacent to one another in the circumferential direction are parallel to one another or the respective actuation edges or actuation surfaces define planes which are arranged parallel to one another. Between these planes the compression springs 30 are arranged. A respective actuation hook 142 is u-shaped in cross section and preferably used for peripherally loading a cross section of a longitudinal end of the compression spring 30 (see FIG. 2); this means the respective cross section of the respective compression spring 30 is force loaded in a radially outer portion and a radially inner portion.

In a torsion vibration damper 1 that is idling, a respective flange hook 202 engages the u-shaped engagement hooks 142 wherein the flange hook substantially centrally engages the compression spring 30 in the respective cross section and substantially extends in the axial direction. A respective engagement edge or a respective actuation surface of the flange hook 202 is thus arranged in the plane recited supra. The flange hooks 202 are provided at a force transmission flange 20 or a hub flange 20 preferably integrally provided there within one piece, wherein the hub flange is mountable, e.g., on a hub of a transmission flange or a hub of a transmission shaft through a support device 24 in particular configured as a support ring 24. Now when the spring support 10 rotates about its rotation axis the actuation hooks 142 transfer the torque of the actuation hooks 142 of the spring support and transfer a centrifugal force through the compression springs 30 to the flange hooks 202 which, in turn, introduce the torque into the force transmission flange 20. The compression spring 30 is thus received and supported by the respective flange hook 202 in order to minimize mechanical friction in/at the u-shaped ring channel 130 (cf. infra). The compression springs 30 provide an effective vibration insulation between the spring support 10 and the force transmission flange 20.

Figure 3:
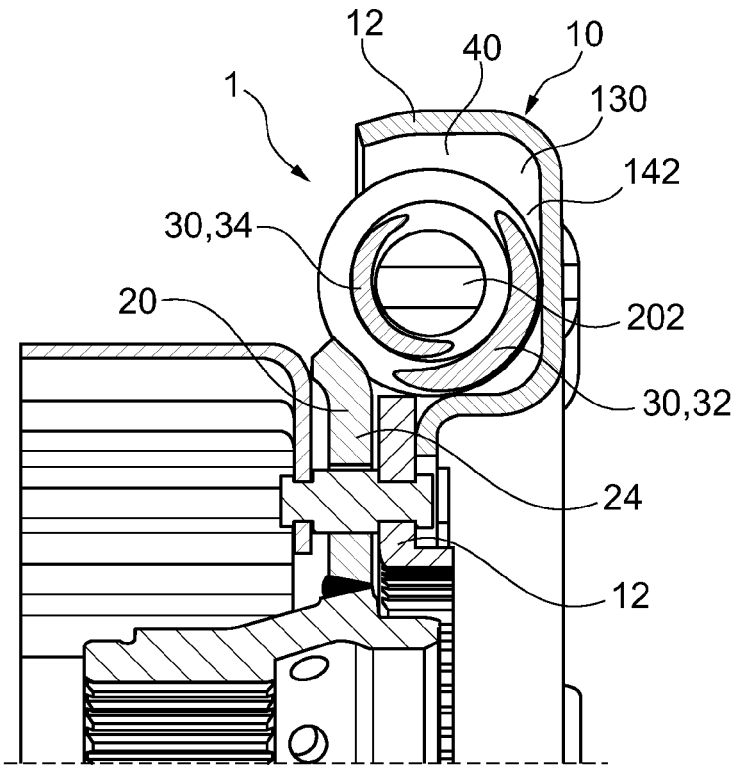
FIG. 3 is a partial cross-sectional view of a first variant of the torsion vibration damper according to the invention with straight compression springs.
Figure 4:
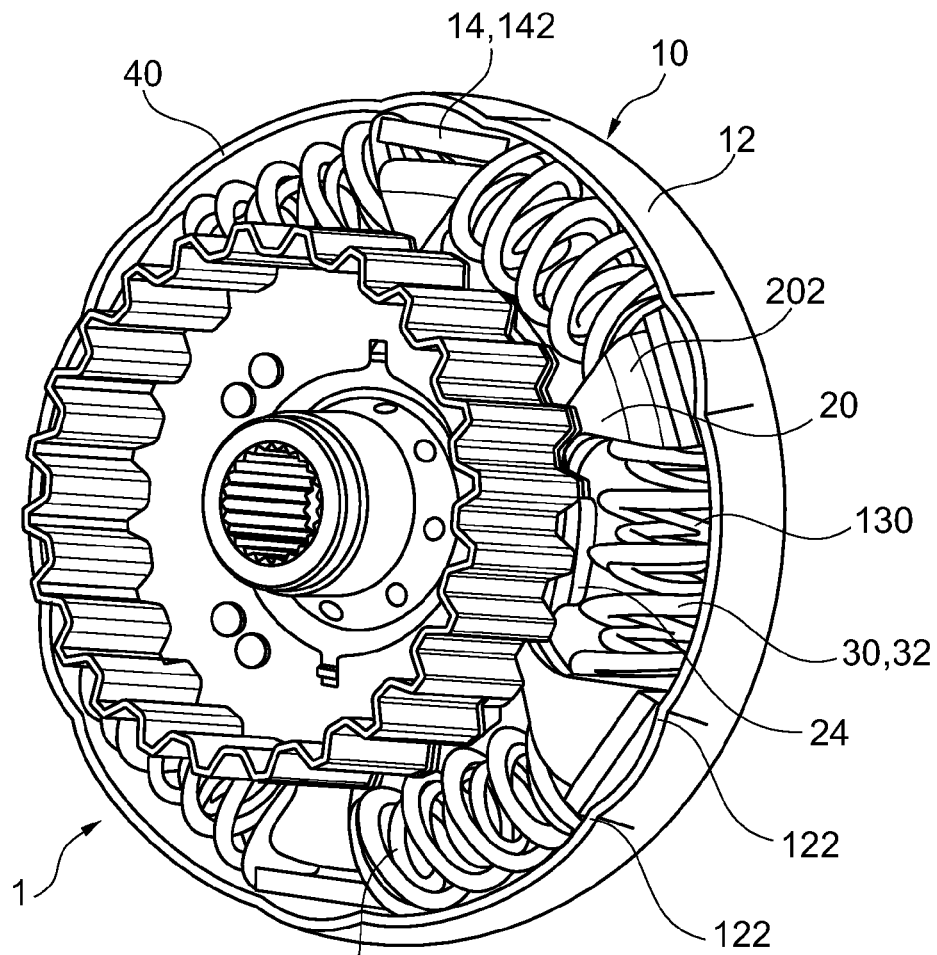
FIG. 4 is a perspective view of a first variant of the torsion vibration damper according to the invention with straight compression springs.
Figure 5:
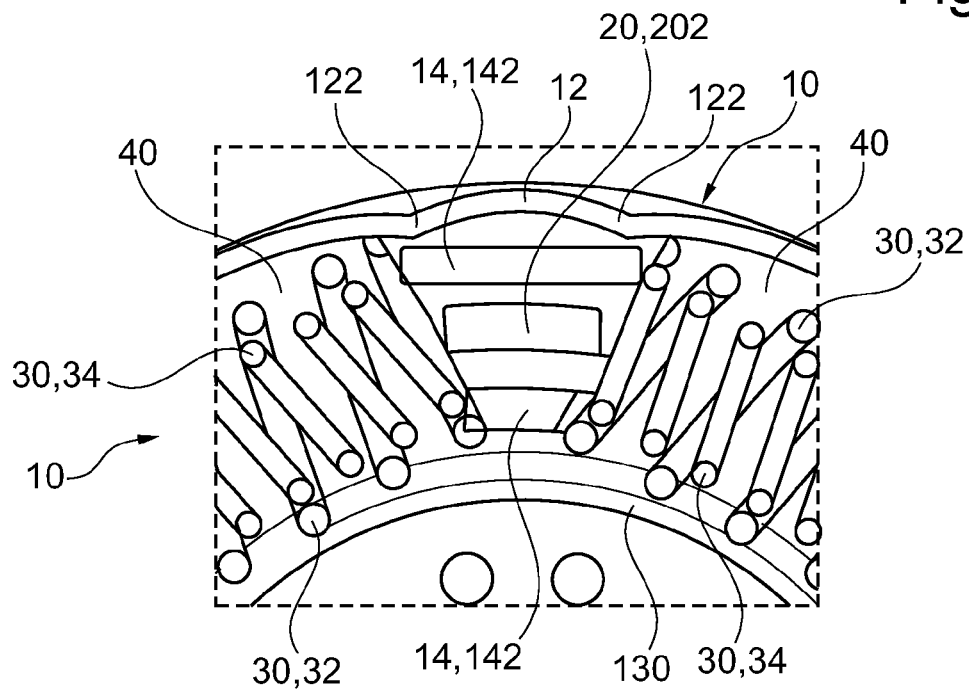
FIG. 5 is a detail of FIG. 4.

According to the invention, the spring support housing 12 of the spring support 10, thus its wall is configured so that in one portion of the respective center sections of the compression springs 30 a sufficient radial clearance 40, thus a height increase is provided (cf. FIGS. 3 and 5). This reduces a mechanical friction occurring between a radial outside of the compression spring 30 and an inside of a radial outer wall of the spring support housing 12. In a respective portion of the longitudinal ends of the compression springs 30 the outer wall of the spring support housing 12 is embossed in an inwardly direction, so that the embossing 122 supports the respective longitudinal end of the compression spring 30 and partially envelops it in its circumferential direction. Thus, also, a protrusion 122 can be used. In the circumferential direction inverted from this engagement of the respective longitudinal end of the respective compression spring 30 at the spring support housing 12 the center section of the compression spring joins at least with the radial clearance 40. It is furthermore preferred that the compression spring 30 essentially in its entire circumferential direction is clear over its center section and this clearance also continues over essentially the entire speed range of the torsion vibration damper 1. The center sections preferably extend to the longitudinal ends of the respective compression spring 30.

Figure 6:
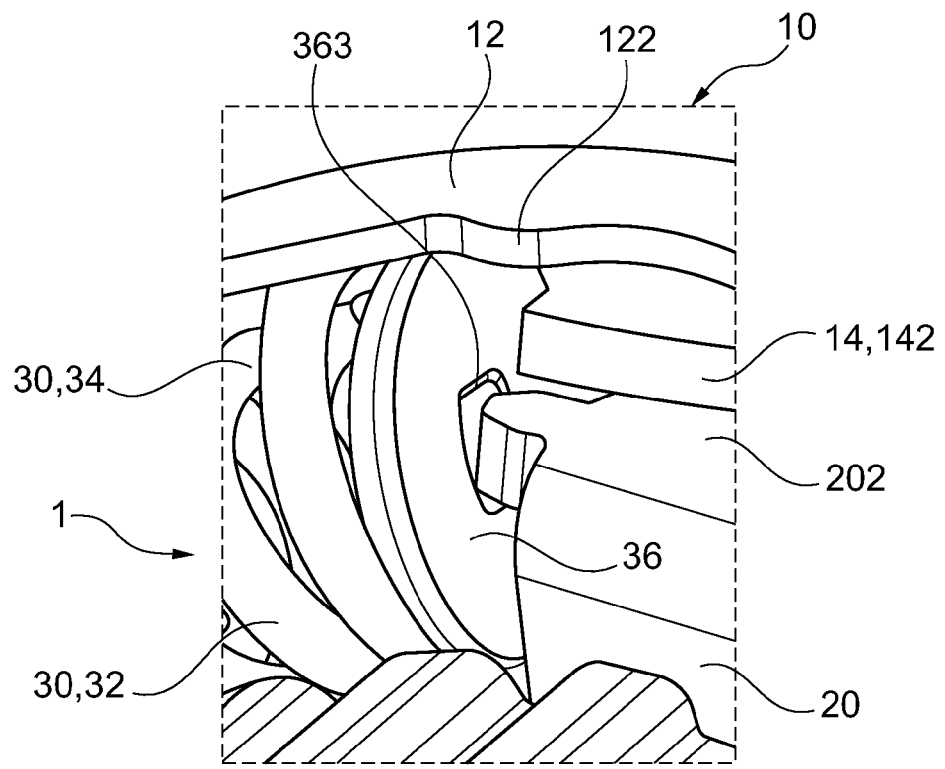
FIG. 6 is a detail of FIG. 4 showing the housing, coil spring, support ring, and flange hook in FIG. 4.
Figure 7:
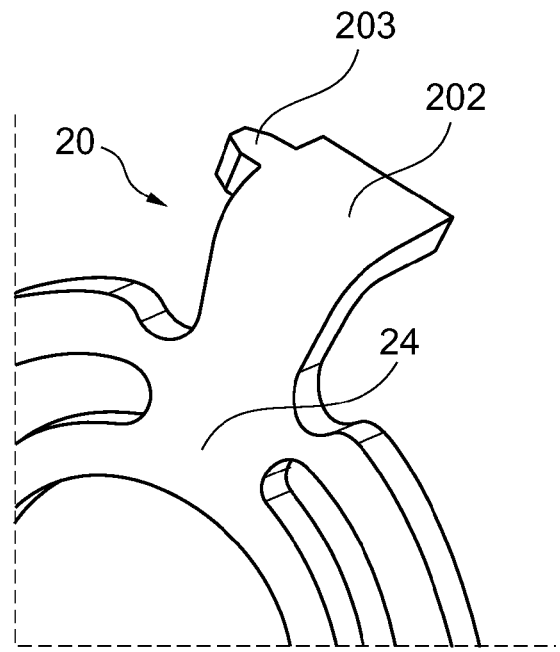
FIG. 7 is a detail of the hub flange in FIG. 4.

In order for the compression spring 30 during vibration insulation, this means during operation of the torsion vibration damper 1, not to move in a radially outward direction the compression spring 30 is positively supported in a loaded condition by the respective flange hooks 202 besides its mechanical preload between two actuation hooks 142 of the spring support 10 (cf. FIGS. 6 and 7). This means the respective longitudinal end of the compression spring 30 is at least partially supported by the flange hook 202. At the opposite longitudinal end the compression spring 30 contacts an actuation hook 142 and at the embossing 122 of the spring support housing 12. The positive guiding of the longitudinal end of the compression spring 30 moving away from the engagement hook 142 is at least provided in a radially outward direction. Preferably the positive guiding, however, can be established so that the respective longitudinal end of the compression spring 30 can neither move respective to the flange hook 202 in the radial nor in the axial direction of the torsion vibration damper 1. Thus a degree of freedom can be provided in a radially inverted direction. This means the respective longitudinal end of the compression spring 30 is supported by the flange hook 202 in the circumferential direction. For this purpose the flange hook 202 includes a protrusion 203 in one embodiment, wherein the protrusion can either engage the compression spring 30 (not illustrated in FIG. 7, cf FIGS. 23 and 24 and infra) or it can engage a recess 363 in an end cap of the compression spring 30. These embodiments can certainly also be used in the subsequently described second variant of the invention.

In the first variant of the invention cost effective straight line compression springs 30 can be used which have lower friction or essentially no friction with the inner wall or an inside of an outer wall of the spring support 10. The torsion vibration damper 1 is easy to assemble, wherein its assembly in sections can also be performed fully automatically. The provided installation space can be fully used in radial and in axial directions. Thus it is possible for the same available installation space to increase the compression spring 30 from a diameter of 23 mm to 32 mm and to increase an effective radius from 60 mm to 76 mm. Thus a total spring rate can be reduced from 60 Nm/° to 30 Nm/° furthermore the configuration of the spring support 10 according to the invention provides good durability for the torsion vibration damper 1.

FIGS. 8 through 17 illustrate a second embodiment of the invention, wherein the torsion vibration damper 1 according to the invention includes three bow compression springs 30 or bow compression spring arrangement 30, subsequently designated as bow springs 30, respectively including an outer spring 32 and an inner spring 34. Certainly, in turn, individual springs or single stage or multi stage parallel springs are useable in a different number. The bow springs 30 are received in a spring support housing 12 of a spring support 10 wherein the spring support housing 12 includes an approximately u-shaped ring channel 130 for this purpose (cf. FIGS. 8 and 9). Thus, the longitudinal extensions of the bow springs 30 are received in the circular ring channel 130. (cf. in particular FIG. 14) wherein the bow springs 30 are at least partially supported in axial and radial directions. With the spring support housing 12 a support device 14 is provided which is, in particular, configured as a support ring 14 wherein the support device offsets the arch springs 30 from one another through actuation hooks 142. For this purpose the approximately plate shaped spring support housing 12 is fixated in an internal portion at the approximately star or disc shaped support device 14 (cf. FIG. 12), in particular riveted together, wherein the actuation hooks 142 radially extend into the u-shaped ring channel 130 (cf. FIG. 8). The spring support 10 is, e.g., mechanically connectible with a turbine (on the right side in FIG. 8 or 9). The application of two shafts at the spring support 10 analogous to the variant provided supra, thus, e.g., the variant of a clutch or the variant of a turbine and, e.g., the variant of an electric motor or another configuration are certainly applicable.

A respective actuation hook 142 of the support device 14 respectively supports a longitudinal end of a bow spring 30 at both its ends in a circumferential direction. For supporting and/or actuating the respective bow spring 30 a respective actuation hook 142 includes an essentially axially and radially extending engagement edge or an actuation surface (cf. FIG. 8) wherein preferably per longitudinal end of bow spring 30 an individual actuation hook 142 includes an approximately u-shaped configuration with a longer arm. Thus, the cross section of the engagement hook 142 initially extends in the radial direction at a longitudinal end of the bow spring 30 and then curves slightly over a center of the cross section of the bow spring 30 in an axial direction along a cross section of the bow spring 30. The longer arm of the u-shaped configuration of the cross section of the actuation hook 142 thus extends from an inside of the spring support housing 12 axially in an outward direction. The actuation edges or actuation surfaces respectively oriented towards one another of two actuation hooks 142 directly adjacent to one another in circumferential direction are arranged rotated relative to one another by the amount of angle that is covered by the bow spring in installed condition.

The longer arm of the actuation hook 142 engages an approximately u-shaped flange hook 202 for an idling torsion vibration damper 1, wherein the flange hook is configured to essentially peripherally load the bow spring 30 with a force in the respective cross section, this means for a force loading of the respective bow spring 30 the bow spring engages the respective flange hook 202 with a radially outer and a radially inner portion. The flange hooks 202 are preferably integrally provided in one piece at a force transmission flange 20 or a hub flange 20, wherein the hub flange is mountable through a support device 24, in particular, configured as a support ring 24, e.g., on a hub of a transmission shaft. When the spring support 10 rotates about its rotation axis the actuation hooks 142 of the spring support transfer a force in a circumferential direction through the bow springs 30 onto the flange hooks 202 wherein the flange hooks introduce the torque into the force transmission flange 20. The bow spring 30 is thus retained and supported by the respective flange hook 202 in order to minimize mechanical friction in/at the u-shaped ring channel 130 (cf. supra). Through the bow spring 30 an effective vibration insulation is provided between the spring support 10 and the force transmission flange 20.

According to the invention the spring support housing 12 of the spring support 10, thus its wall is configured so that a sufficient radial clearance 40 is provided in a portion of the respective center sections of the bow springs 30, thus a height increase (cf. FIGS. 9, 15 through 17). Thus an occurring mechanical friction between a radial outside of the bow spring 30 and an inside of a radial outer wall of the spring support housing 12 is reduced. In a respective portion of the longitudinal ends of the bow springs 30 the outer wall of the spring house 12 is embossed inward so that the embossing 122 supports the respective longitudinal end of the bow spring 30 or partially envelopes it in a circumferential direction of the bow spring. For this purpose also a protrusion 122 can be used. In a circumferential direction from this engagement of the respective longitudinal end of the respective bow spring 30 on the inside of the spring support housing 12, the center section of the bow spring is arranged with at least the radial outer clearance 40. Thus, it is also preferable that the bow spring 30 is clear essentially in its entire circumferential direction over the center section and this clearance also continues essentially over the entire speed range of the torsion vibration damper 1. The center sections also preferably extend to the longitudinal ends of the respective bow springs 30.

Figure 16:
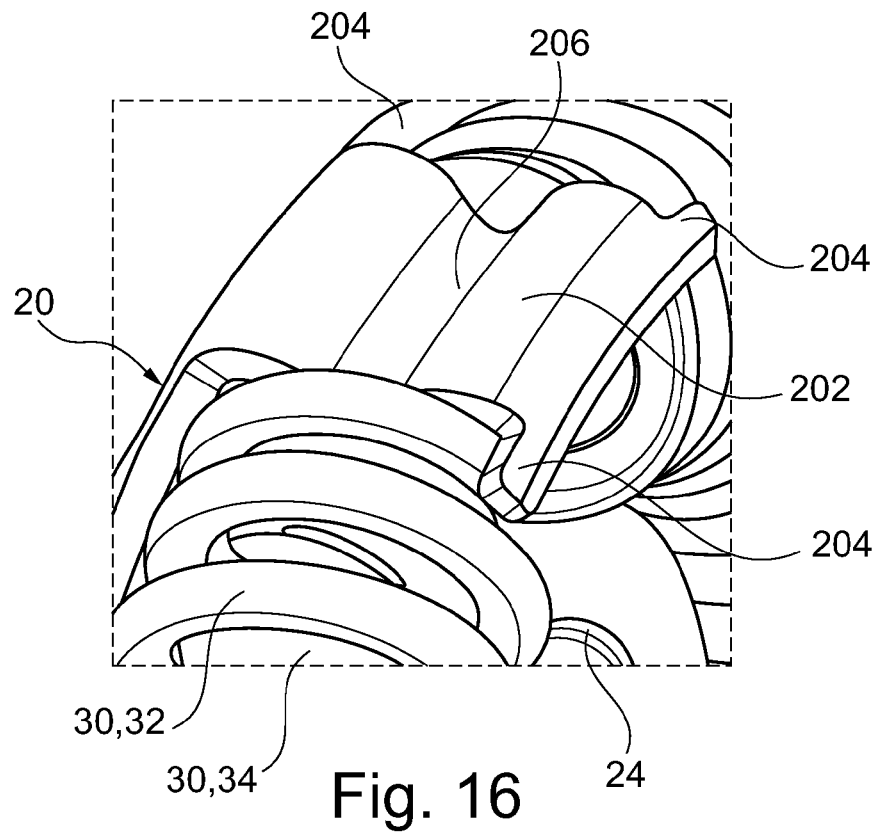
FIG. 16 is a detail of the hub flange, lug, flange hook, and coil spring of FIG. 11.
Figure 17:
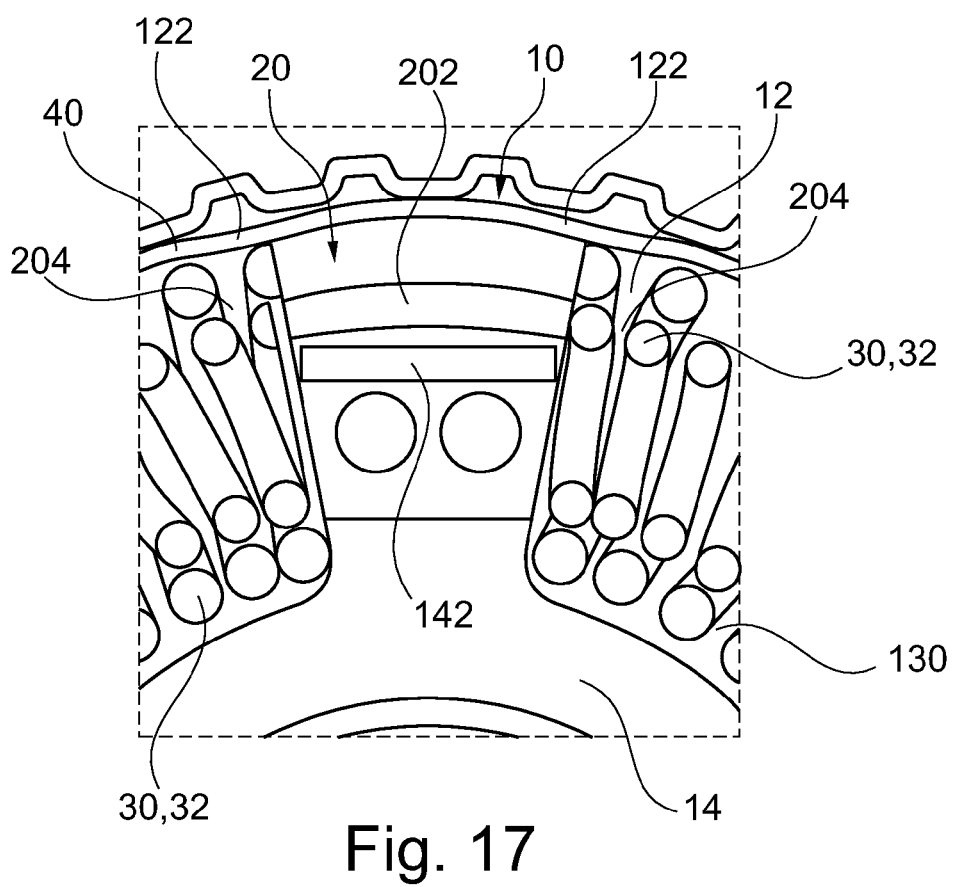
FIG. 17 is a detail of the hub flange, lug, flange hook, and coil spring of FIG. 11.

For a respective longitudinal end of the bow spring 30 during vibration insulation, this means during operation of the torsion vibration damper 1, not to move away in a radially outward direction, the bow spring 30 is positively supported in loaded condition in addition to its mechanical pre-loaded between two actuation hooks 142 between the spring support 10 by respective flange hooks 202 (cf. FIGS. 16 and 17). This means the respective longitudinal end of the bow spring 30 is at least partially supported by the flange hook 202. At the opposite longitudinal end the bow spring 30 contacts an actuation hook 142 and the embossing 122 of the spring support housing 12. The positive support of the longitudinal end of the bow spring 30 moving away from the respective actuation hook 142 is at least provided in a radial outward direction. Preferably, the positive support, however, can be established so that the respective longitudinal end of the bow spring 30 is at least partially supported relative to the flange hook 202 also in an axial direction of the torsion vibration damper 1. Thus, one degree of freedom can be permitted in a radial inner direction. This means the respective longitudinal end of the bow spring 30 is supported by the flange hook 202 in circumferential direction. For this purpose the flange hook 202 in one embodiment includes a catch lug 204 which protrudes from the flange hook in a tangential and/or circumferential direction (cf. FIG. 16).

The respective catch lug 204 or the respective catch lugs 204 fixate the respective longitudinal end of the bow spring 30 at least in a radial direction so that the longitudinal end cannot move away in a radial outward direction when the torsion vibration damper 1 rotates, thus, it is preferable that the catch lug 204 reaches over an outer portion of the bow spring 30 wherein the outer portion is remote from a radial outset of the bow spring 30 which furthermore provides a certain amount of axial fixation. Preferably two catch lugs 204 are arranged radially and laterally on the outside at the respective bow spring and fixate the bow spring. Thus two associated catch lugs 204 of two adjacent flange hooks 202 can be connected with one another, in particular integrally made from one piece. Thus, preferably, the connection is raised from an outside of the bow spring 30 (not illustrated in the drawing). In particular, the respective flange hook 202 includes two respective catch lugs 204 at both its circumferential sides (cf. FIG. 16), wherein the catch lugs 204 of a plurality of flange hooks 202 on one side of the force transmission flange 20 are preferably integrally connected to form a ring. Preferably, the respective flange hook 202 includes a formed surface and a protrusion 206 (FIGS. 8 and 16) and a protrusion 206 so that it can contact the cross section of the bow spring 30, wherein the formed surface 206 or the protrusion 206 preferably reaches up to a longitudinal end of the inner spring 34. The embodiments can certainly also be implemented for the first variant of the invention describe supra.

Figure 8:
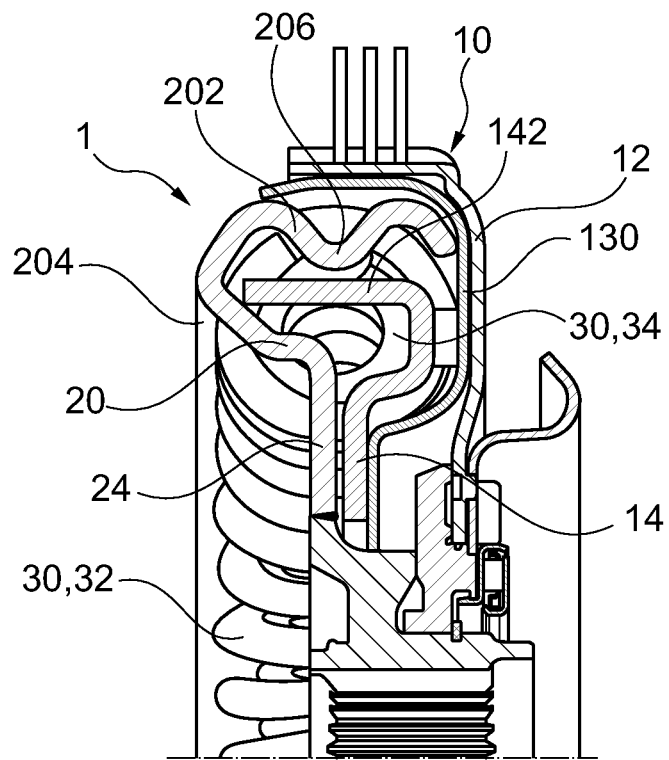
FIG. 8 is a partial cross-sectional view of a second variant of the torsion vibration damper according to the invention with arcuate compression springs.
Figure 9:
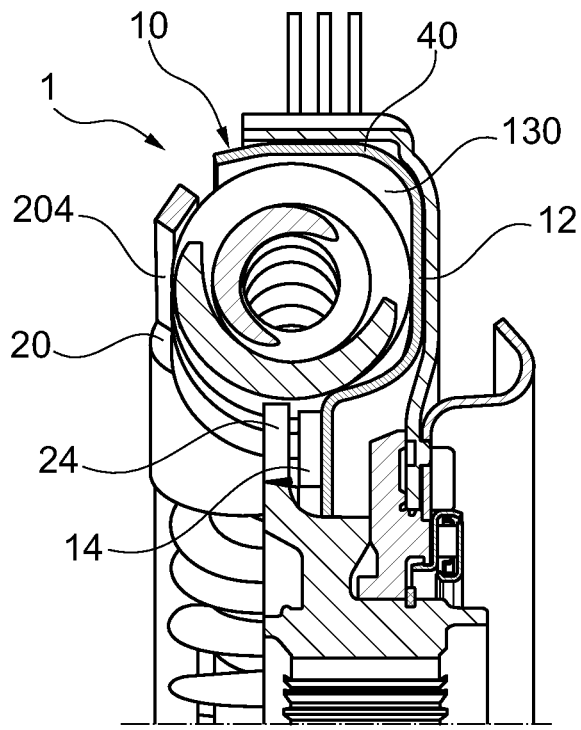
FIG. 9 is a partial cross-sectional view of a second variant of the torsion vibration damper according to the invention with arcuate compression springs.
Figure 10:
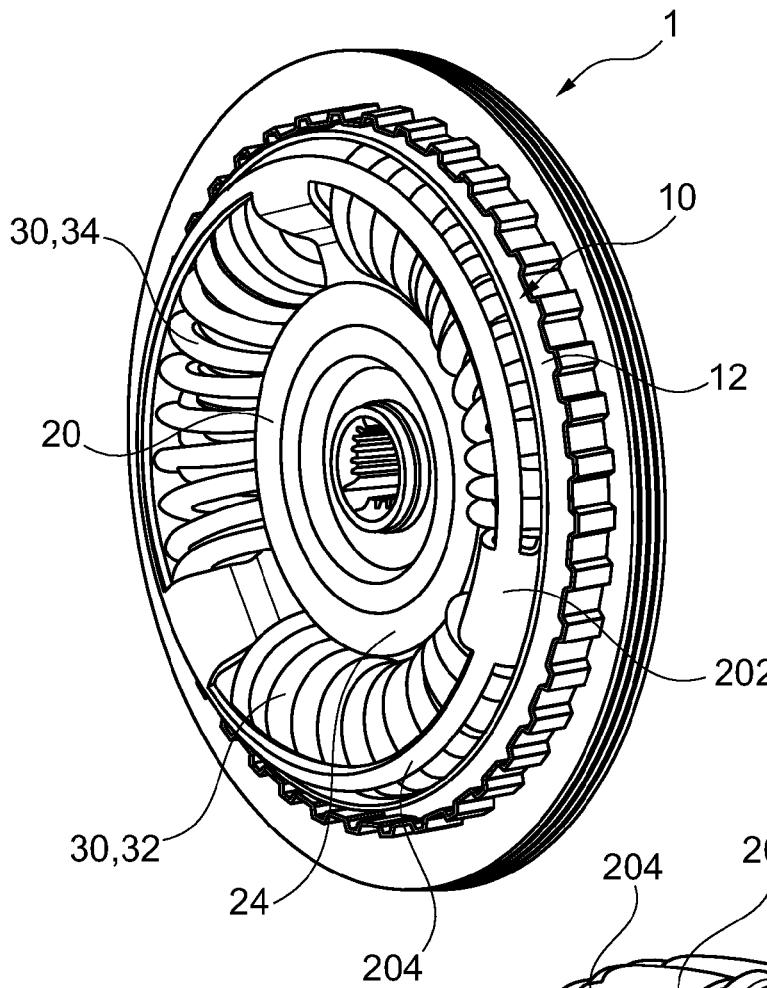
FIG. 10 is a perspective view of the second variant of the torsion vibration damper according to the invention with arcuate compression springs.
Figure 11:
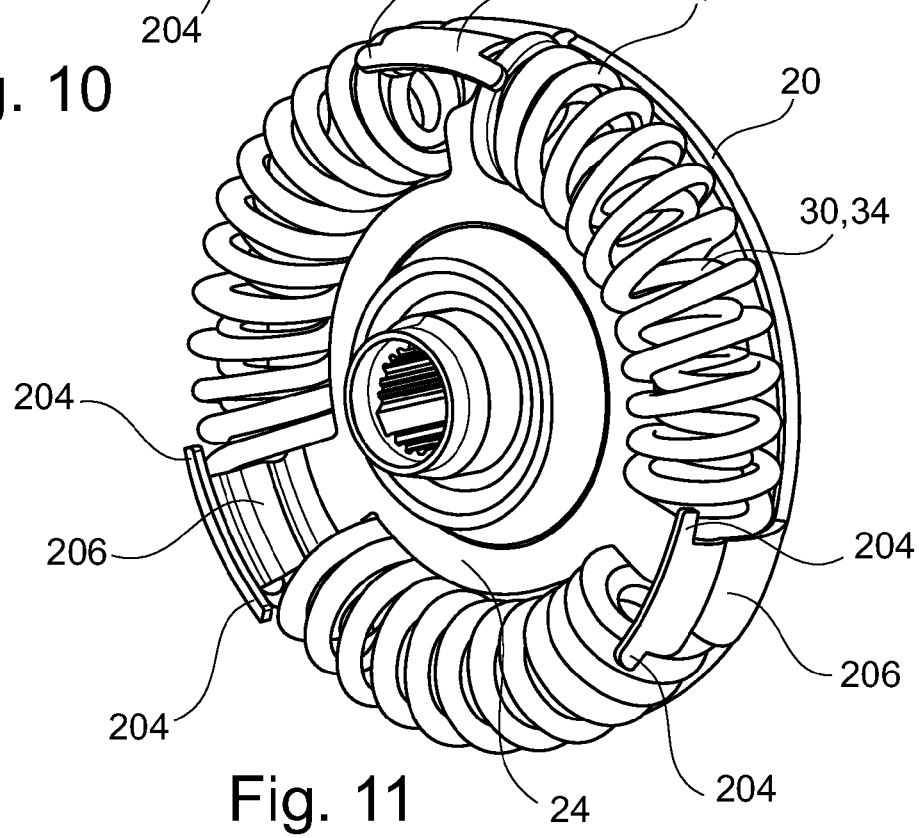
FIG. 11 is a perspective view of the second variant of the torsion vibration damper according to the invention with arcuate compression springs.
Figure 14:
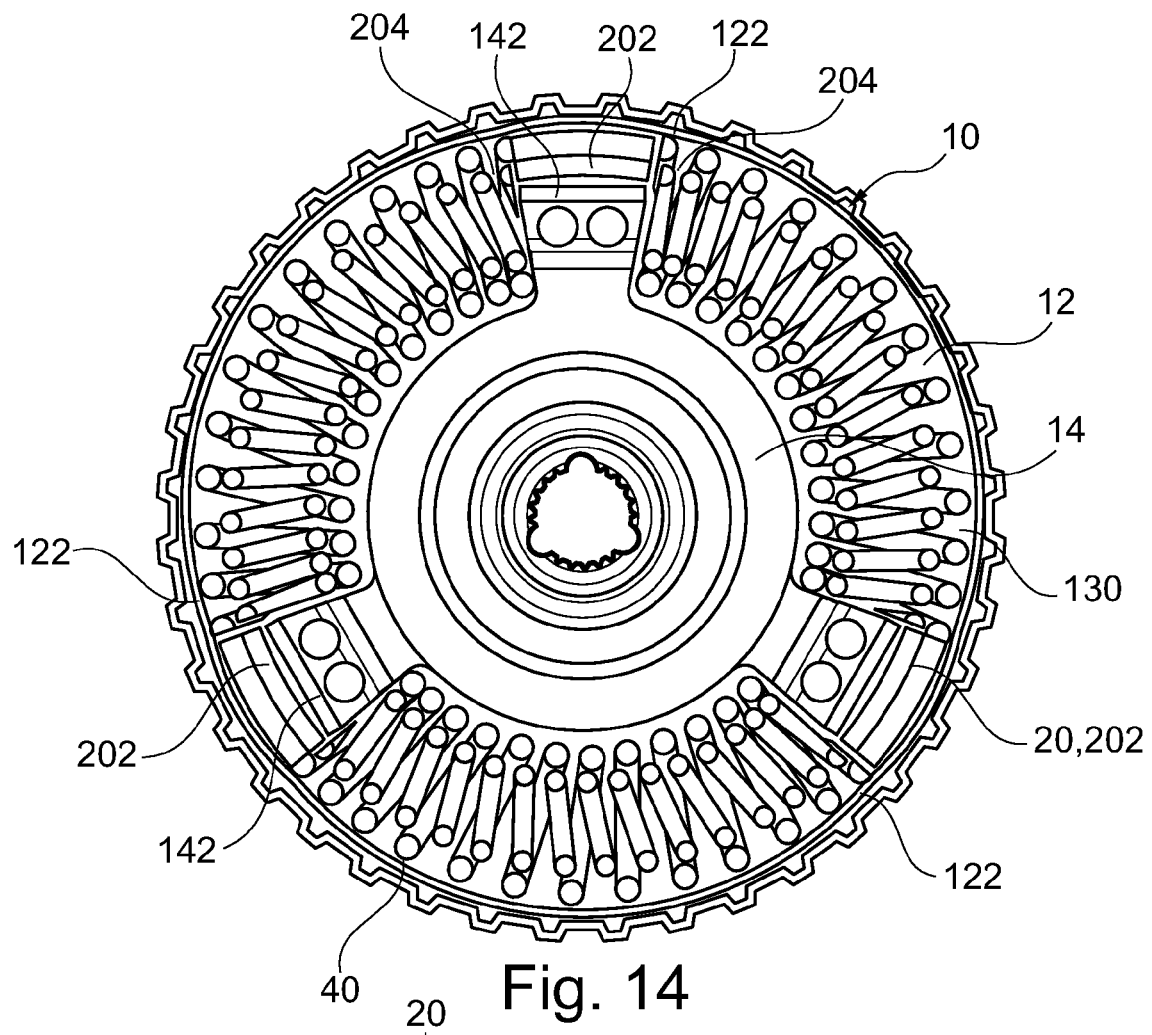
FIG. 14 is a front view of a second variant of the torsion vibration damper according to the invention with arcuate compression springs.
Figure 15:
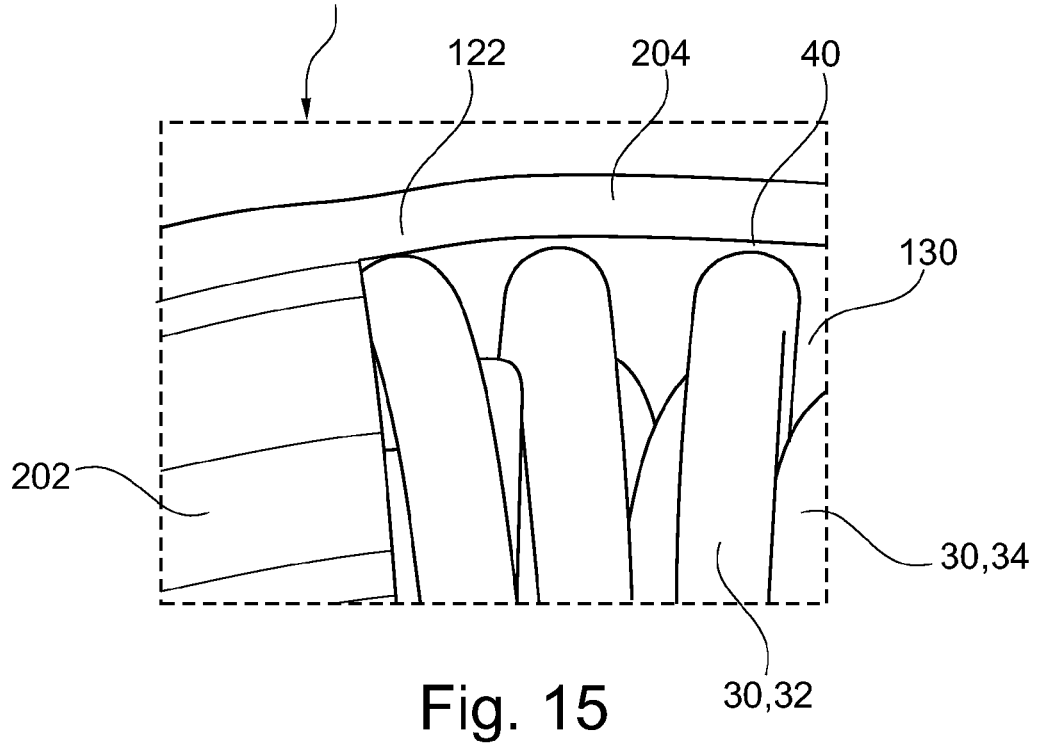
FIG. 15 is a detail of the flange hook, lug, and coil spring of FIG. 11.

Thus, the force transmission flange 20 is preferably configured so that it does not provide a radial height increase with respect to the bow spring 30. This means the flange hooks 202 are arranged so that they do not extend in a radial direction beyond the bow springs 30. Furthermore, the catch lugs 204 of the flange hooks 202 are arranged laterally offset relative to a center line of the compression springs, so that a radially outer portion is, at the most, at the same height as the radially outer portion of the bow springs 30 (FIGS. 8, 16 and 17). By arranging the catch lugs 204 on both sides axially offset relative to the center of the respective bow spring 30 no additional radial installation space is required above the bow springs 30 for the centrifugal force support. By providing the formed surface 206 or the protrusion 206 in/at the flange hook 202, using end caps 36 can be omitted. The opposite component in the force flow, thus the actuation hook 142 engages the force transmission flange 20 in an axial or a horizontal direction and actuates the outer spring 32 and also the inner spring 34 preferably radially slightly outside the respective spring center. In order to facilitate simple assembly of the bow springs 30 with a large spring rate, it is conceivable to provide the catch lugs 204 only on a tension side, wherein a stiffening of the force transmission flange 20 in the manner recited supra has to be omitted.

FIGS. 18 through 20 illustrate the third embodiment like a flange hook 202 of the force transmission flange 20, the compression spring 30, thus a straight compression spring 30 (first variant of the invention) or a curved compression spring 30 (bow spring 30, second variant of the invention, wherein only one bow spring is also illustrated in FIGS. 21 through 41 and the following also applies to embodiments of the first variant) and an actuation hook 142 of the spring support 10 or of the support device 14 can interact. The flange hook 202 and the actuation hook 142 are configured analogous to FIG. 1, wherein the flange hook 202 can horizontally reach over a comparatively broad nose at the end cap 36 of the compression spring 30 which prevents a movement of the respective longitudinal end of the compression spring 30 in a radially outward direction. Thus the flange hook 202 reaches over the nose at the end cap 36 in a radial direction partially in a form locking manner. When the longitudinal end of the compression spring 30 tries to move in a radially outward direction due to a rotation of the torsion rotation damper 1, the flange hook 202 restricts this movement due to the engagement of the nose at the flange hook 202. The end cap 36 is thus mounted with a centering flange (FIG. 18) at the inner spring 34 of the compression spring 30 which is preferably used for embodiments with an end cap 36. Furthermore, the actual end of the compression spring contacts a flat side of the end cap 36 which is opposite to the lug.

Figure 21:
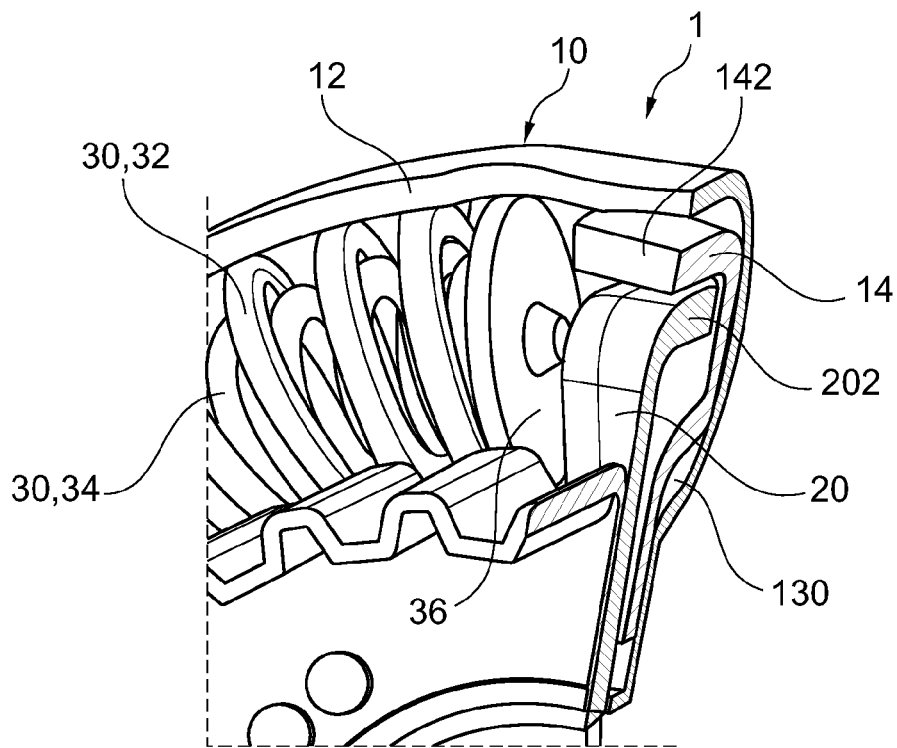
FIG. 21 is a detail of the hub flange, lug, flange hook, and coil spring of FIG. 11.
Figure 22:
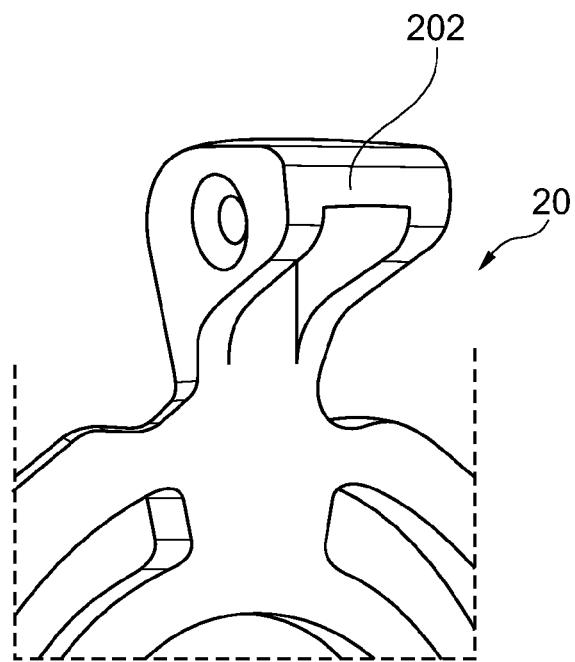
FIG. 22 is a detail of the hub flange of FIG. 11.

FIGS. 21 and 22 illustrate a fourth embodiment of the invention which is analogous to the third embodiment, wherein the end cap 36 of the compression spring 30 preferably includes a central conical, cylindrical, or cone shaped protrusion or a lug. Other shapes and positions of the protrusion are certainly also usable. The flange hook 202 of the force transmission flange 20 is configured flat at the respective actuation edge which is configured as a radially folded catch lug, wherein the flange hook 202 starting from this surface includes a recess that is configured corresponding to the protrusion. When the flange hook 202 contacts the end cap 36 of the compression spring 30 the protrusion at the end cap 36 is essentially received in a form locking manner in the blind hole recess of the flange hook 202. Thus the engagement hook 142 is configured analogous to FIG. 20, the flange hook 202 however has a larger actuation surface through which it can contact the end cap 36.

Figure 23:
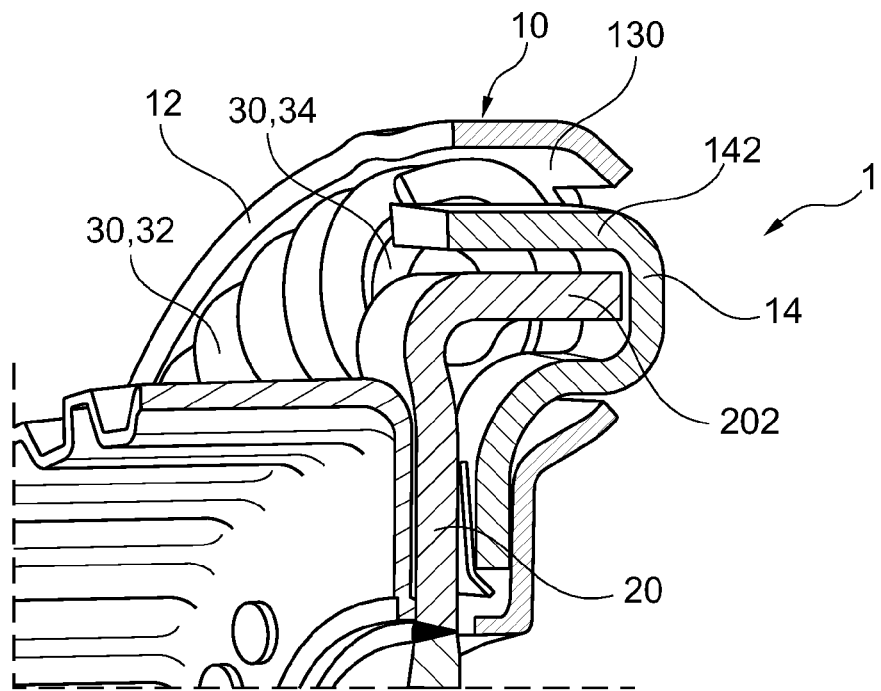
FIG. 23 is a partial cross-sectional view of a second variant of the torsion vibration damper according to the invention with arcuate compression springs.
Figure 24:
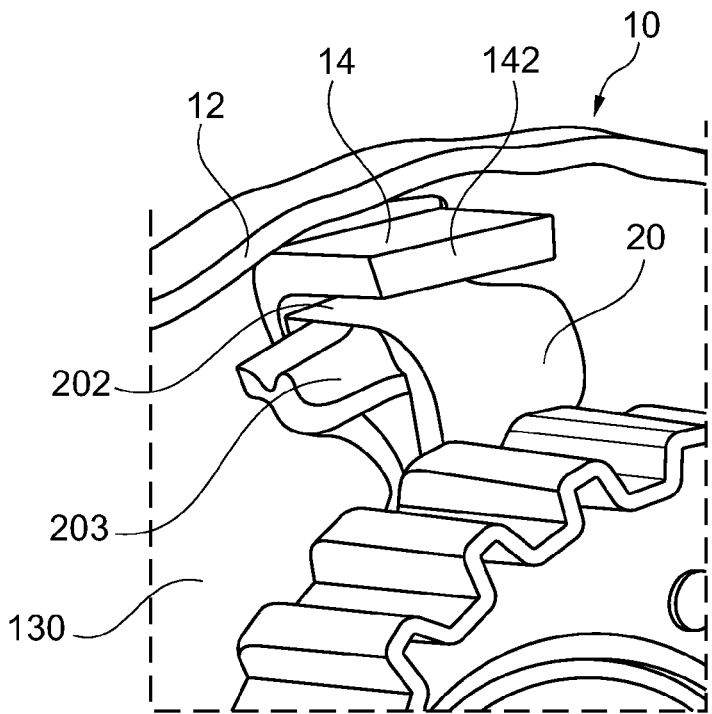
FIG. 24 is a detail of FIG. 23.

Furthermore, FIGS. 23 and 24 illustrate the fifth embodiment of the invention wherein the flange hook 202 and the actuation hook 142 are configured analogous to FIG. 1. For radially catching the compression spring 30, the flange hook 202 includes a protrusion 203 extending there from a circumferential and/or tangential direction, or an integrally formed lug which can engage the compression spring 30, in particular, the inner spring 34. Thus the shape of the protrusion 203 is partially configured form locking with an inner contour of the inner spring 34. Lateral edges adjacent to the protrusion 230 when catching the compression spring 30 engage preferably axially opposite portions at the cross section of the outer spring 32 and inner spring 34. An end cap 36 can be omitted in this embodiment.

Figure 25:
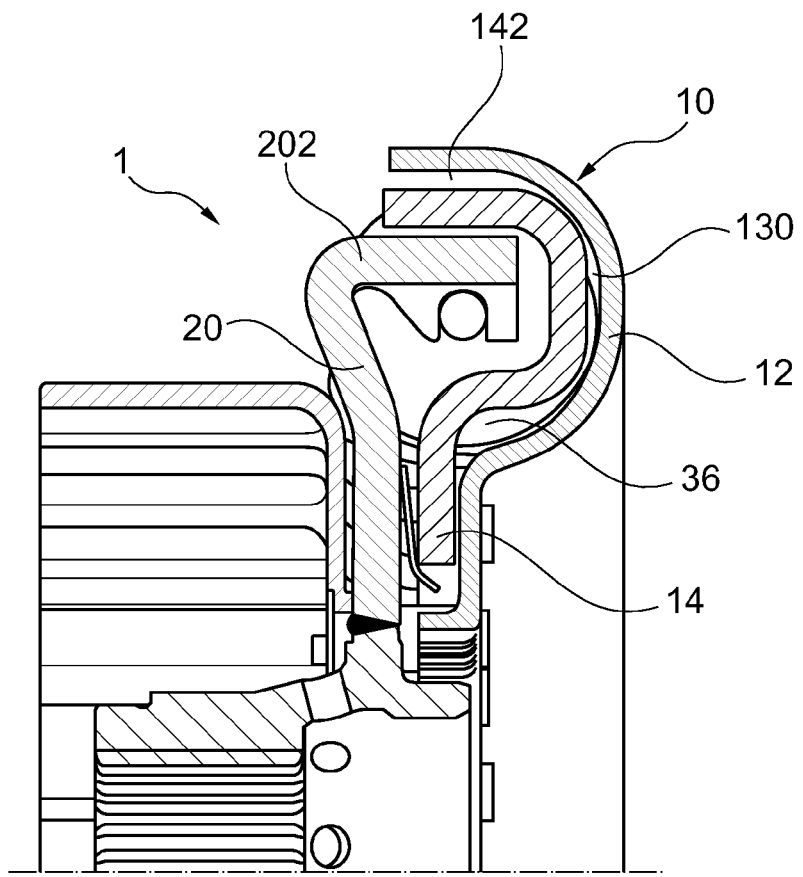
FIG. 25 is a partial cross-sectional view of a second variant of the torsion vibration damper according to the invention with arcuate compression springs.
Figure 26:
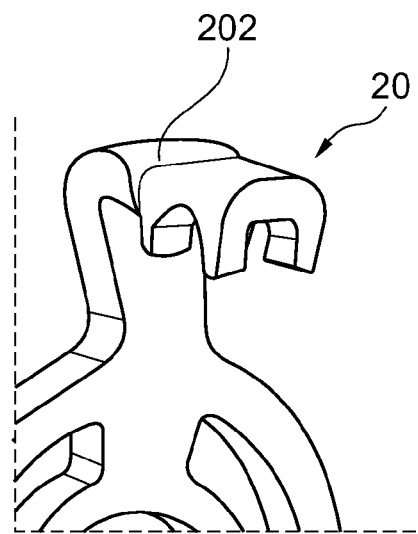
FIG. 26 is a detail of the hub flange in FIG. 25.

FIGS. 25 and 26 represent the sixth embodiment of the invention, wherein the flange hook 202 and the actuation hook 142 are configured analogous to FIGS. 21 and 22. Contrary to the embodiment illustrated in these figures, the recess of the flange hook 202 is a pass through recess which is, furthermore, open at a radially inner side (slot), so that the protrusion of the end cap 36 of the compression spring 30 has a radial degree of freedom, namely in a radially inverted direction. An actuation surface of the flange hook 202 for the end cap 36 of the compression spring is configured analogous to the fourth embodiment as a folded over catch lug with a flat surface. Thus, a protrusion of the end cap 36 is preferably configured as a short cylindrical pin; other shapes are certainly also usable (cf. supra).

Figure 2:
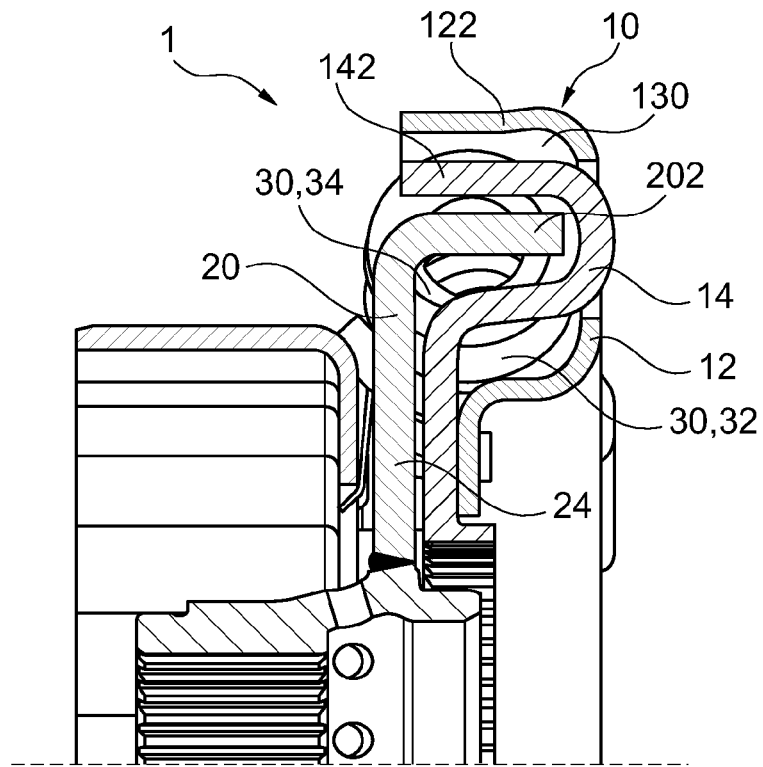
FIG. 2 is a partial cross-sectional view of a first variant of the torsion vibration damper according to the invention with straight compression springs.
Figure 27:
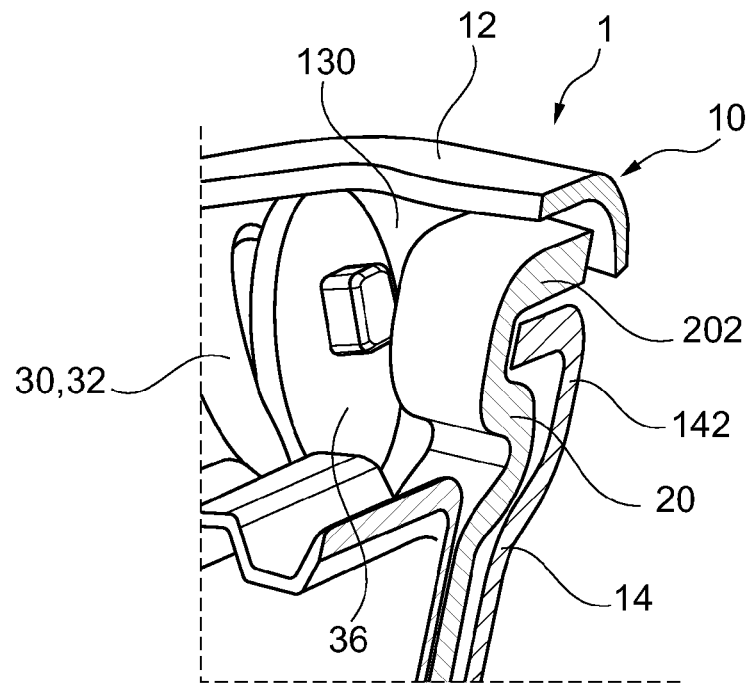
FIG. 27 is a detail of the spring retainer, support ring, hub flange, and coil of a second variant of the torsion vibration damper according to the invention with arcuate compression springs.
Figure 28:
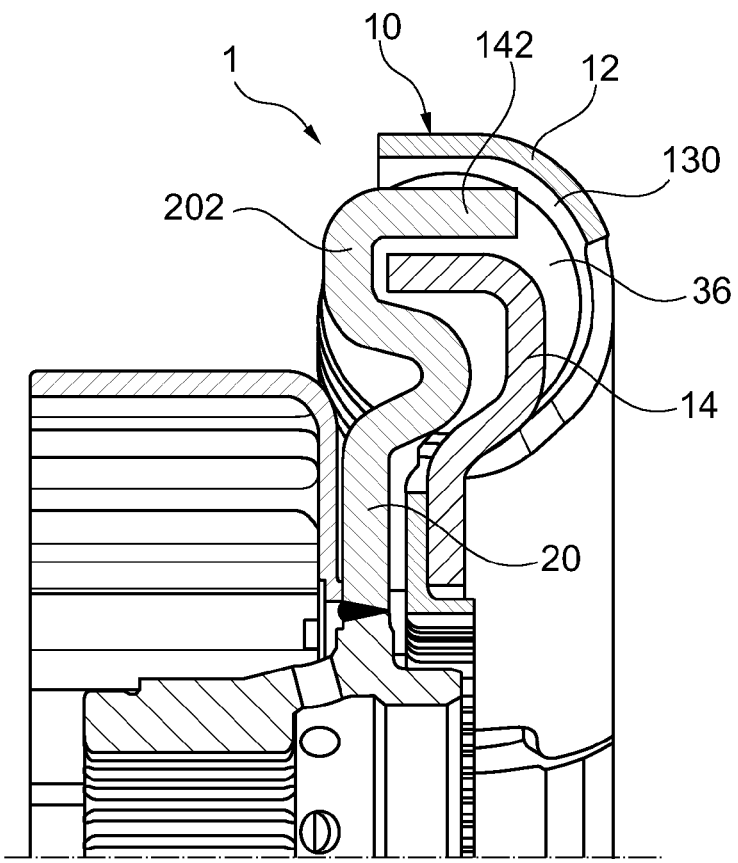
FIG. 28 is a partial cross-sectional view of a second variant of the torsion vibration damper according to the invention with arcuate compression springs.

Furthermore, FIGS. 27 and 28 illustrate the seventh embodiment of the invention wherein the flange hook 202 and the actuation hook 142 are configured analogous to FIG. 2. And end cap 36 of the compression spring 30 includes a protrusion with a flat free end which can engage the actuation hook 142. The flange hook 202 when transferring torques from the flange hook 202 to the compression spring 30 reaches over the protrusion of the end cap 30 partially in a form locking manner. Thus, another portion of the flange hook 202 can contact further on the radial inside at the protrusion and also at the end cap 36. Preferably the protrusion is provided in a radial direction of the torsion vibration damper 1 slightly offset to the outside but otherwise centrally arranged with respect to the longitudinal end of the compression spring 30.

Figure 29:
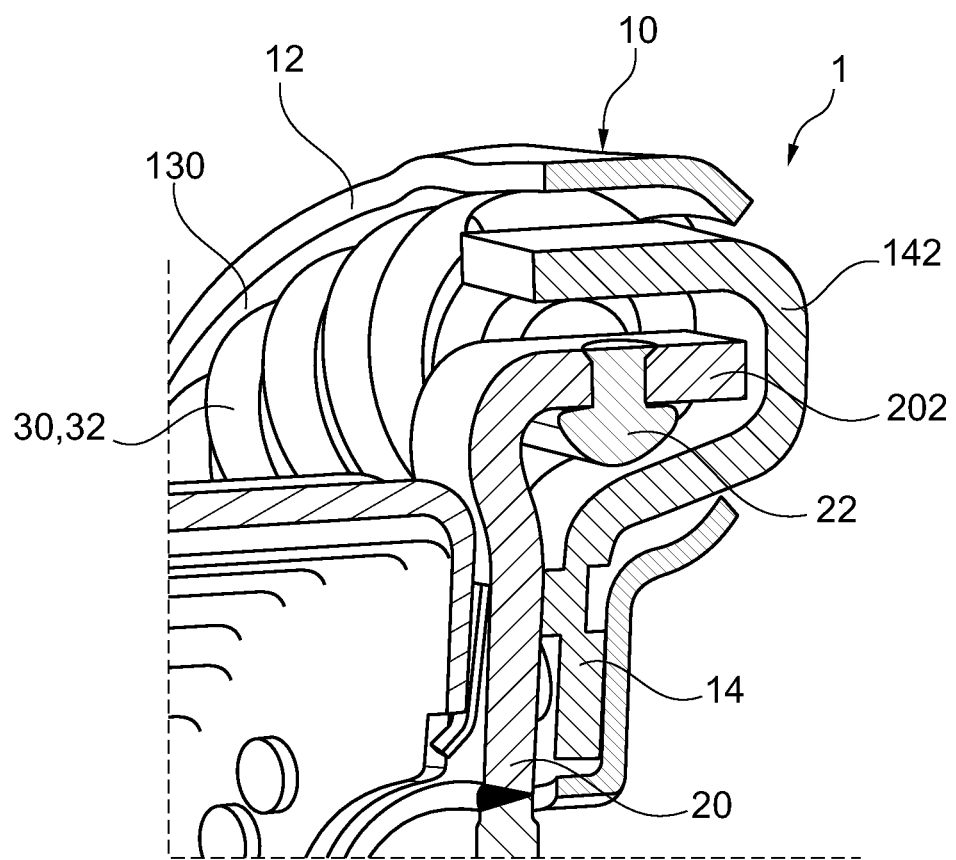
FIG. 29 is a partial cross-sectional view of a second variant of the torsion vibration damper according to the invention with arcuate compression springs.
Figure 30:
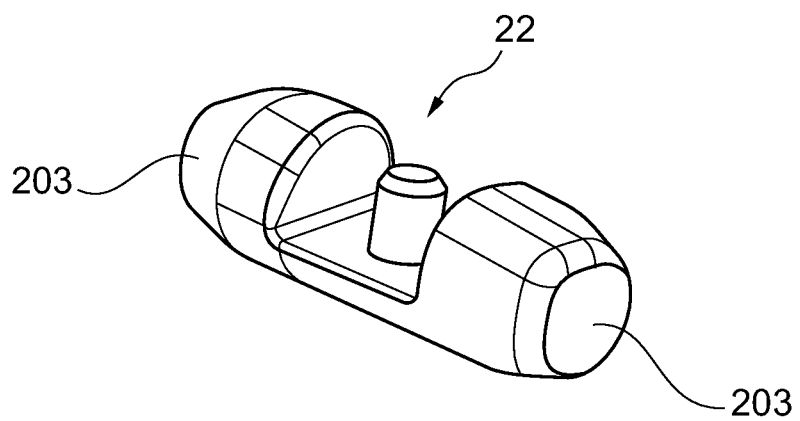
FIG. 30 is a detail of an engagement pin.

FIGS. 29 and 30 illustrate the eight embodiment of the invention wherein an end cap 36 of the compression spring 30 can be omitted. The flange hook 202 and the actuation hook 142 are, in turn, configured analogous to FIG. 2. Furthermore the flange hook 202 includes a so-called engagement pin 22 which is attached through a central protrusion in a recess, in particular a pass through a recess of a horizontal section of the flange hook 202 which can also be designated as "submarine hookup." When the flange hook 202 transfers a force onto the compression spring 30 a longitudinal end section of the engagement pin 22 protrudes into the compression spring 30, in particular into the inner spring 34. Lateral horizontal portions of the flange hook 202 thus preferably contact the outer spring 32 and the inner spring 34.

Figure 31:
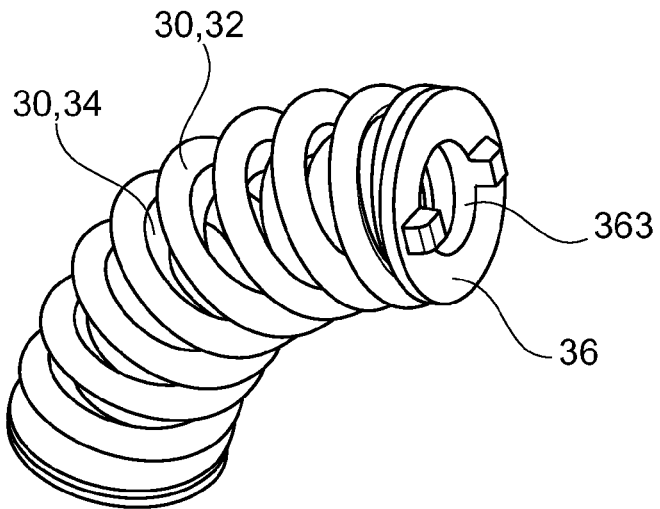
FIG. 31 is a detail of a coil spring.
Figure 32:
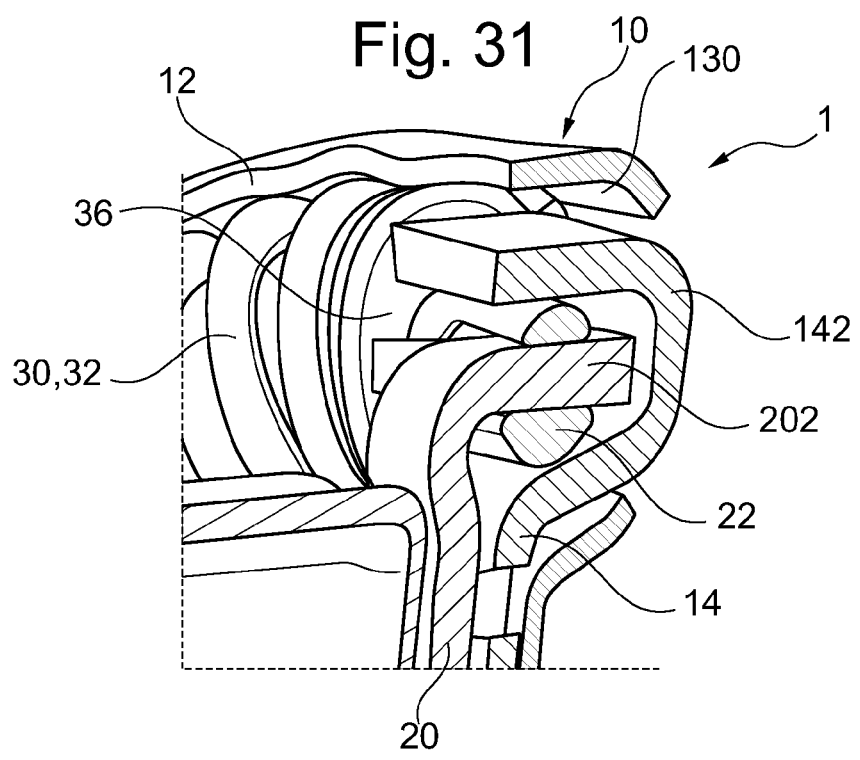
FIG. 32 is a partial cross-sectional view of a second variant of the torsion vibration damper according to the invention with arcuate compression springs.
Figure 33:
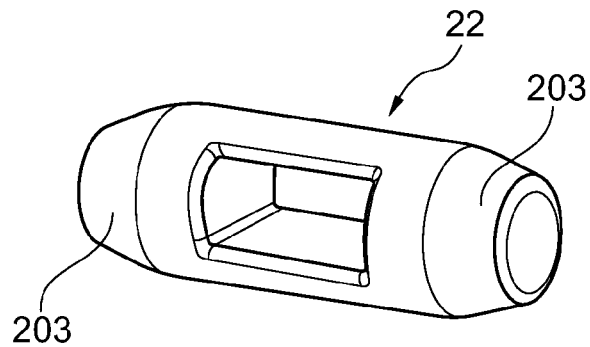
FIG. 33 is a detail of an engagement pin.

Furthermore, FIGS. 31 through 33 illustrate the ninth embodiment of the invention wherein an end cap 36 of the compression spring 30 and an engagement pin 22 are being used. The flange hook 202 and the actuation hook 142 are, in turn, configured analogous to FIG. 2. The engagement pin 22 includes a lateral central pass through recess through which the engagement pin is attached on the flange hook 202 which can also be designated as "torpedo engagement". The end cap 36 includes a pass through recess in which the engagement pin 22 can engage. Preferably, the engagement pin 22 also engages a compression spring 30 or the inner spring 32. Furthermore, the end cap 36 can have protrusions with flat free ends adjacent to its pass through recess in an axial direction wherein lateral horizontal portions of the flange hook 202 can engage the flat free ends.

The tenth embodiment of the invention is illustrated in FIGS. 34 through 36, wherein an arrangement of this type is designated as "hinge configuration." Thus, the flange hook 202 essentially engages an end cap 36 of the compression spring 30 in a vertical or a radial direction wherein the end cap 36 preferably includes a central conical, cylindrical, or cone shaped protrusion or lug. Other forms and positions of the protrusion are certainly also usable. The flange hook 202 is configured at the respective actuation edge as axially folded over catch lug, wherein the actuation edge preferably completely envelopes the protrusion and force is transferred onto the end cap 36. The actuation hook 142 of the spring support 10 can thus engage a periphery of the end cap 36 in a radial and an axial direction outside of the flange hook 202. It is furthermore preferred that the spring support housing 12 includes an additional hook 120 which support the end cap 36 at a side opposite to the actuation hook 142.

Figure 37:
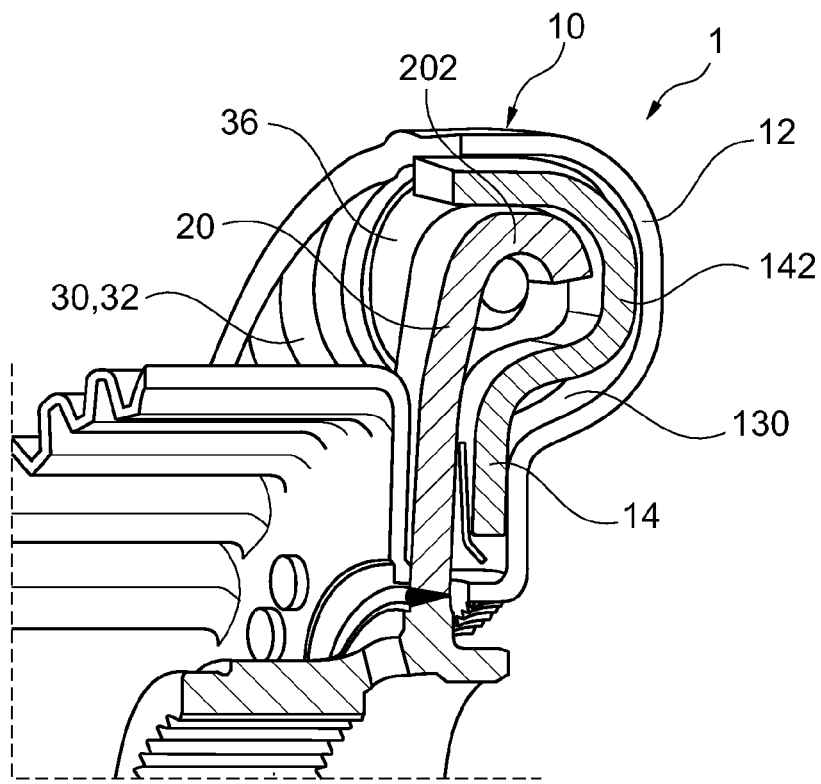
FIG. 37 is a partial cross-sectional view of a second variant of the torsion vibration damper according to the invention with arcuate compression springs.
Figure 38:
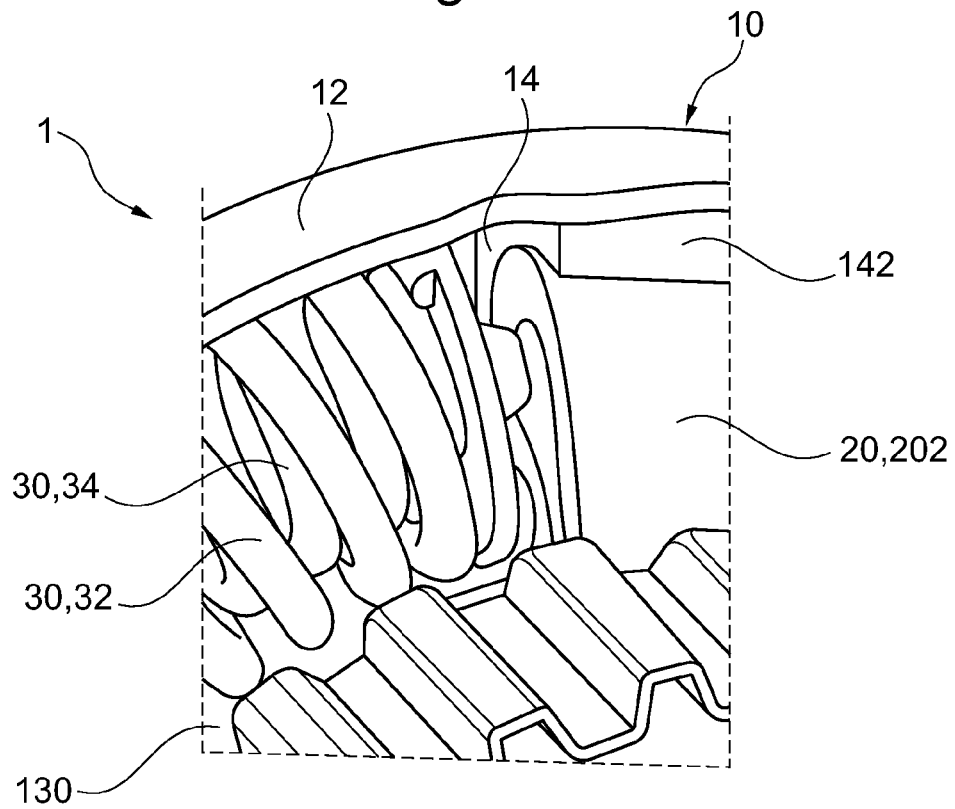
FIG. 38 is a detail of FIG. 37.

FIGS. 37 and 38 illustrate the eleventh embodiment of the invention where the actuation hook 142 of the support device 14 is configured analogous to FIG. 20, wherein an arrangement of this type can be designate as "hinge configuration" the flange hook 202 of the force transmission flange 20 and the end cap 36 of the compression spring 30 are thus configured analogous to FIG. 35, wherein the actuation edge of the flange hook 202 during force transmission onto the end cap 36 only partially envelopes the protrusion. Thus the engagement edge of the flange hook 202 partially envelopes the protrusion on the radial outside thus, in turn, a partial full locking is created.

Figure 41:
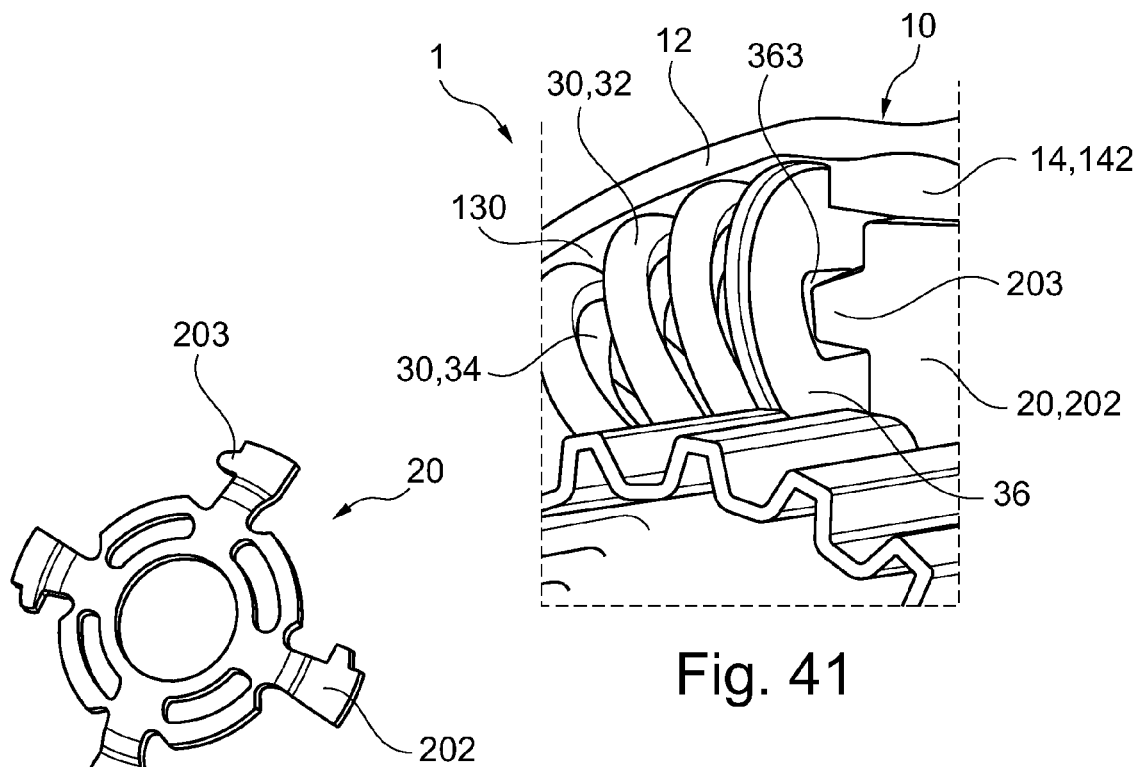
FIG. 41 is a detail of FIG. 40.
Figure 39:
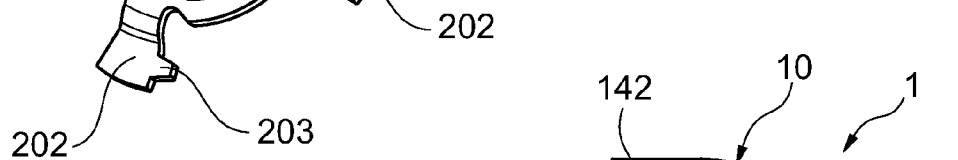
FIG. 39 is a detail of a hub flange.
Figure 40:
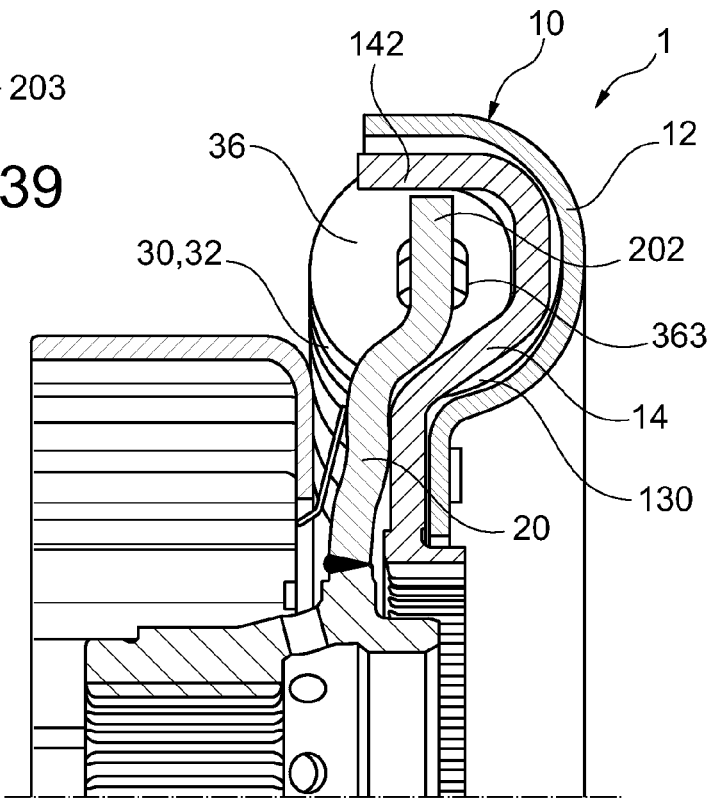
FIG. 40 is a partial cross-sectional view of a second variant of the torsion vibration damper according to the invention with arcuate compression springs.

Eventually, FIGS. 39 through 41 illustrate the twelfth embodiment of the invention which includes a force transmission flange 20 with vertically or radically extending flange hooks 202 wherein the actuation hook 142 is configured analogous to FIG. 2. The flange hook 202 includes a protrusion 203 through which the flange hook 202 can engage the end cap 36 of the compression spring 30 wherein the end cap is provided with a recess or a pass through recess.

The statements made supra can, respectively, only apply to a circumferential side of the flange hook 202 or of the respective longitudinal end of the compression spring 30 or the bow spring 30, or also to both circumferential sides of the flange hook 202, both longitudinal ends of the respective compression spring 30 or the respective bow spring 30, wherein these can be configured differently as a function of the embodiments of the invention.

REFERENCE NUMERALS AND DESIGNATIONS 1 torsion vibration damper
10 spring support, spring receiver, spring support ring, spring retainer
12 spring support housing
14 support device in particular support ring
20 force transmission flange, hub flange
22 engagement pin
24 support device in particular support ring
30 compression spring, compression spring assembly, straight compression spring, bow compression spring bow spring, coil spring
32 outer compression spring, outer spring, spring
34 inner compression spring, inner spring, spring
36 end cap, actuation cap
40 clearance, clearance between wall of the spring support housing 12 and the compression spring 30, 32
120 additional hook
122 protrusion, embossing
130 u-shaped ring channel
142 actuation hook
202 flange hook
203 protrusion
204 catch lug, lug
206 formed surface, protrusion
363 recess, pass through recess

What is claimed is:

1. A torsion vibration damper for a drive train of a motor vehicle, in particular a drive train of a hybrid vehicle, comprising:

a spring support (10) and a force transmission flange (20) configured rotatable relative to the spring support (10), wherein at least one compression spring (30) is provided between the spring support (10) and the force transmission flange (20) for transferring a mechanical torque, wherein a housing (12) of the spring support (10) is configured so that in a radial direction of the torsion vibration damper (1) at least one longitudinal end of the compression spring (30) is supported at/in the spring support housing (12) and/or a clearance (40) remains between windings of a center section of the compression spring (30) and a wall of the spring support (10):

wherein the compression spring (30) is a straight compression spring (30), wherein the spring support housing (12) includes a u-shaped ring channel (130) in which the straight compression spring (30) is partially received in a radial direction and in an axial direction of the torsion vibration damper (1), wherein an actuation hook (142) is provided for a support and/or an actuation of the straight compression spring (30) in the u-shaped ring channel (130) of the spring support housing (12) caused by the spring support housing (12), wherein a respective longitudinal end of the straight compression spring (30) contacts the actuation hook or is contactable at the actuation hook, and wherein the actuation hook (142) is provided at a support device (14) which is in particular configured as a support ring (14) which is attached in the spring support housing (12), wherein the actuation hook (114) of the support device (14) extends into the u-shaped ring channel (130).

2. The torsion vibration damper recited in claim 1 wherein the respective longitudinal end of the compression spring (30) is partially enveloped in circumferential direction by the spring support housing (12), wherein the spring support housing (12) includes a protrusion (122), in particular an embossing (122) for enveloping the compression spring (30), wherein a respective longitudinal end of the compression spring (30) is contactable or contacted at the protrusion or embossing,
- wherein the protrusion (122) is provided in a radially outer portion of the spring support housing (12) so that it extends inward into the spring support housing (12).

3. The torsion vibration damper recited in claim 1,
- wherein a flange hook (202) of the force transmission flange (20) is actuatable by the straight compression spring (30), wherein the force transfer flange is centrally arranged relative to a face of the straight compression spring (30).

4. The torsion vibration damper recited in claim 1,
- wherein a flange hook (202) of the force transmission flange (20) and a longitudinal end or a longitudinal end section of the compression spring (30) are configured in a corresponding manner, so that the flange hook (202) supports the longitudinal end of the compression spring (30) at least in a radial outward direction,
- wherein the flange hook (202) engages the compression spring (30) or an end cap (36) of the compression spring through an engagement pin (22), or the flange hook (202) reaches over a protrusion at the compression spring (30) or the end cap (36) of the compression spring (30) at least on the radial outside or vice versa.

5. The torsion vibration damper recited in claim 1,
- wherein a respective flange hook (202) includes at least one catch lug (204) which extends there from substantially in a circumferential or tangential direction of the force transmission flange, wherein the catch lug reaches over the respective compression spring (30) at least at its longitudinal end on an outside,
- wherein reaching over the compression spring (30) through the catch lug (204) is provided in an axially offset manner with respect to a center of a cross section of the compression spring and two catch lugs (204) are provided that are arranged offset relative to the center of the cross section of the compression spring (30),
- wherein two catch lugs (204) of two adjacent flange hooks (202) can be connected with one another, wherein a connection portion of the two catch lugs (204) is configured so that it is lifted off from the compression spring (30).

6. The torsion vibration damper recited in claim 1,
- wherein a respective flange hook (202) includes a formed surface (206) or a protrusion (206) at a radially outer portion so that an actuation edge or an actuation surface of the flange hook (202) is oriented towards a center of the compression spring (30), and
- wherein the engagement edge or the engagement surface of the flange hook (202) for engaging the compression spring (30) is configured so that the engagement edge or the engagement surface preferably partially follows approximately a contour of the cross section of the compression spring (30), wherein the actuation edge or surface is preferably u shaped with a short arm.

7. The torsion vibration damper recited in claim 1, wherein an actuation hook (142) of the spring support housing (12) is arranged so that the actuation hook actuates or supports the compression spring (30) axially on both sides essentially symmetrically and radially outside of the center of the compression spring (30), wherein the compression spring (30) can include an outer spring (32) and an inner spring (34).

8. A damping device for a drive train of a motor vehicle including: a torsion vibration damper, turbine damper, pump damper, dual-mass converter, or dual-mass flywheel or a combination thereof, wherein the damping device includes a torsion vibration damper (1) that is configured according to claim 1.

9. A torsion vibration damper for a drive train of a motor vehicle, comprising:
- a spring support housing forming a circumferentially disposed channel having an approximate U-shape in a cross-section orthogonal to an axis of rotation for the torsion vibration damper, the approximate U-shape having an opening facing in a direction parallel to an axis of rotation for the torsion vibration damper;
- a transmission flange rotatable with respect to the spring support housing and including a first portion, substantially parallel to the axis of rotation, located within the circumferentially disposed channel;
- a support ring, separate from the spring support housing, fixedly connected to the spring support housing and including a second portion located within the circumferentially disposed channel; and,
- a compression spring at least partially located within the circumferentially disposed channel and including first and second ends and a center section between the first and second ends, wherein:
  - the spring support housing, the transmission flange, and the support ring are fastened to each other only at a point radially inward of the compression spring;
  - a radially outermost portion of the first end of the compression spring is in contact with the spring support housing;
  - the first end of the compression spring is engaged with the support ring and the transmission flange; and,
  - a clearance is present in a radial direction between the spring support housing and a radially outermost portion of the center section of the compression spring.

* * * * *